(12) United States Patent
Herron et al.

(10) Patent No.: US 11,512,897 B2
(45) Date of Patent: Nov. 29, 2022

(54) FLUID RECOVERY PROCESS AND APPARATUS

(71) Applicant: Air Products and Chemicals, Inc., Allentown, PA (US)

(72) Inventors: D. Michael Herron, Fogelsville, PA (US); Alan D. Berger, Ambler, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 182 days.

(21) Appl. No.: 17/148,758

(22) Filed: Jan. 14, 2021

(65) Prior Publication Data
US 2022/0221221 A1 Jul. 14, 2022

(51) Int. Cl.
*F25J 3/02* (2006.01)
*F25J 3/04* (2006.01)

(52) U.S. Cl.
CPC ......... *F25J 3/04412* (2013.01); *F25J 3/0409* (2013.01); *F25J 3/0423* (2013.01); *F25J 3/04084* (2013.01); *F25J 3/04096* (2013.01); *F25J 2200/06* (2013.01); *F25J 2210/40* (2013.01); *F25J 2210/42* (2013.01); *F25J 2210/58* (2013.01); *F25J 2245/42* (2013.01)

(58) Field of Classification Search
CPC .. F25J 3/04666; F25J 3/04412; F25J 3/04084; F25J 3/04648; F25J 3/04672; F25J 3/04654; F25J 3/0409; F25J 3/04096; F25J 3/0423; F25J 2200/06; F25J 2210/40; F25J 2210/42; F25J 2210/58; F25J 2245/42; F25J 2250/52
See application file for complete search history.

(56) References Cited

U.S. PATENT DOCUMENTS

| 4,022,030 | A | | 5/1977 | Brugerolle | |
|---|---|---|---|---|---|
| 4,822,395 | A | | 4/1989 | Cheung | |
| 5,355,681 | A | * | 10/1994 | Xu | F25J 3/04381 62/646 |
| 2019/0072326 | A1 | * | 3/2019 | Chakravarthy | F25J 3/04745 |
| 2019/0331416 | A1 | * | 10/2019 | Prosser | F25J 3/04412 |
| 2019/0331417 | A1 | | 10/2019 | Kromer et al. | |
| 2019/0331418 | A1 | | 10/2019 | Prosser et al. | |
| 2019/0331419 | A1 | | 10/2019 | Handley et al. | |

* cited by examiner

*Primary Examiner* — Brian M King
(74) *Attorney, Agent, or Firm* — Matthew R. Weaver

(57) ABSTRACT

A process for recovering at least one fluid (e.g. argon gas and/or nitrogen gas, etc.) from a feed gas (e.g. air) can include utilization of a compression system, primary heat exchanger unit, plant processing units to separate and recover at least one desired fluid (e.g. nitrogen gas, argon gas, etc.). In some embodiments, the process can be configured so that fluid flows output from a low pressure column and/or high pressure column of the plant can provide a condensation duty or refrigeration duty that is utilized to process certain fluid flows for recovery of argon and/or nitrogen gases. Some embodiments can be configured to provide an improved recovery of argon and/or nitrogen as well as an improvement in operational efficiency by reducing an amount of power (e.g. electrical power) needed to recover the nitrogen and/or argon.

20 Claims, 6 Drawing Sheets

FLUID RECOVERY PROCESS AND APPARATUS

FIELD OF THE INVENTION

The present innovation relates to processes utilized to recover fluids (e.g. oxygen, argon and nitrogen) from air, gas separation plants configured to recover nitrogen, argon and/or oxygen from at least one feed gas, air separation plants, air separation systems, systems utilizing multiple columns to recover nitrogen, argon, and oxygen fluids, and methods of making and using the same.

BACKGROUND OF THE INVENTION

Electronic chip manufacturers have traditionally required nitrogen gas for their facilities. Air separation processing was utilized to provide nitrogen gas for such facilities. Examples of systems that were developed in conjunction with air separation processing include U.S. Pat. Nos. 4,022,030 and 4,822,395 and U.S. Pat. App. Pub. Nos. 2019/0331417, 2019/0331418, and 2019/0331419.

Chip manufacturing facilities often utilized air separation processes designed to produce predominantly nitrogen gas flows as well as waste oxygen. The waste oxygen contained most of the oxygen and argon in the incoming air, plus some unrecovered nitrogen. A typical waste oxygen output flow composition from such facilities is 65% oxygen, 3% argon, and 32% nitrogen.

More recently, some manufacturers may require the air separation plant in their facility to supply high purity argon as well as nitrogen. Typically, such systems are designed so that the oxygen purity of the oxygen waste output flow must be greater than 99.5% to 99.9% oxygen, zero nitrogen, and the balance argon.

SUMMARY

We have determined that some air separation processes designed to provide high-purity nitrogen and argon fluids for use by a manufacturing facility (e.g. a chip manufacturing facility or other facility that may have such needs, etc.) can often produce large quantities of high-purity oxygen, which has little or no value to the facility operator. We have determined that such air separation processing can be designed to reduce the power needed to form nitrogen and argon fluid flows. In some arrangements, we have determined that it is possible to improve the argon recovery without increasing power consumption or providing a reduction in overall power consumption, which can improve processing efficiency and also make the process more environmentally friendly.

In some embodiments, a process for separation of a feed gas comprising oxygen, nitrogen, and argon can include compressing a feed gas via a compression system of a separation system having a first column and a second column. The first column can be a high pressure (HP) column operating at a pressure that is higher than the second column. The second column can be a low pressure (LP) column operating at a pressure that is lower than the first column. The process can also include feeding the compressed feed gas to a first heat exchanger to cool the compressed feed gas, feeding at least a first portion of the compressed and cooled feed gas to the HP column to produce a first HP nitrogen-enriched vapor and a first HP oxygen-enriched stream, condensing at least a portion of the first HP nitrogen-enriched vapor via a first reboiler-condenser to form an HP condensate so that a first portion of the HP condensate is recyclable to the HP column and a second portion of the HP condensate is feedable to the LP column, and outputting a first nitrogen-rich vapor stream, a first nitrogen-enriched waste stream, a first LP oxygen-rich liquid steam, and a first argon-enriched vapor stream from the LP column. The first LP oxygen-rich liquid can have an oxygen content of at least 98 mol % oxygen. The process can also include feeding the first argon-enriched vapor stream to an argon column to form a first argon-rich vapor stream that is feedable to a second reboiler-condenser and an argon-depleted liquid stream that is feedable to the LP column, at least partially condensing the first argon-rich vapor stream output from the argon column via the second reboiler-condenser, and mixing the first nitrogen-enriched waste stream output from the LP column with the first LP oxygen-rich liquid stream output from the LP column for forming a mixed nitrogen-oxygen fluid stream to feed to the second reboiler-condenser to provide at least a portion of a refrigeration duty of the second reboiler-condenser for the at least partially condensing of the first argon-rich vapor stream.

In some embodiments, the argon-enriched vapor stream can be 5-25 volume % (vol. %) argon and the first argon-rich vapor stream can be 100-95 vol. % argon. For instance, the first argon-rich vapor stream can be 0-4 vol. % oxygen, 0-0.5 vol. % nitrogen, and the balance argon (e.g. 100-95.5 vol. % argon).

In some embodiments, the first HP nitrogen-enriched vapor stream can include 100-99 vol. % nitrogen and the HP oxygen-enriched stream can include 30-40 vol. % oxygen, and 1-3 vol. % argon, and the balance nitrogen (e.g. 69-57 vol. % nitrogen).

In some embodiments, the first nitrogen-rich vapor stream can include 99-100 vol. % nitrogen, the first nitrogen-enriched waste stream can include 95-99 vol. % nitrogen, and the first LP oxygen-rich liquid steam has an oxygen content of (i) at least 98 mol % oxygen, (ii) greater than or equal to 99.5 mol % oxygen, (iii) 98-100 mol % oxygen, or (iv) 98-99.5 mol % oxygen.

Embodiments of the process can also include other processing steps. For example, embodiments of the process can include splitting the compressed feed gas into the first portion and a second portion and feeding the second portion of the compressed feed gas to an expander for reducing its pressure for feeding it to the LP column after the second portion of the compressed feed gas is passed through the first heat exchanger. As another example, the process can include passing the first nitrogen-rich vapor stream and the second portion of the HP condensate through a subcooler so that the second portion of the HP condensate is cooled via the subcooler before the second portion of the HP condensate is fed to the LP column. The first nitrogen-rich vapor stream can be a top nitrogen-rich vapor stream that is output from the LP column.

In some embodiments, the feed gas can be air (e.g. air from the atmosphere external to a plant). The compression system can include at least one compressor having one or more stages for compression of the feed gas. The compression system can also include other elements. For example, the compression system can also include a purification unit that removes at least one of carbon dioxide and water from the feed gas after the feed gas is compressed.

In some embodiments, the first nitrogen-enriched waste stream can be a first nitrogen-enriched liquid waste stream. In some of these embodiments, the mixed nitrogen-oxygen fluid stream can be a mixture of the first nitrogen-enriched liquid waste stream and the first LP oxygen-rich liquid stream.

In other embodiments, the first nitrogen-enriched waste stream can be a first nitrogen-enriched vapor waste stream. In some of these embodiments, the mixed nitrogen-oxygen fluid stream can be a mixture of the first nitrogen-enriched vapor waste stream and the first LP oxygen-rich liquid stream.

In some embodiments, the mixing can include mixing the first nitrogen-enriched vapor waste stream with the first LP oxygen-rich liquid stream to form a mixture and subsequently feeding the mixture to a phase separator to form the mixed nitrogen-oxygen fluid stream. This mixed nitrogen-oxygen fluid stream can be a liquid.

In other embodiments, the mixing can be performed via a mixing column such that the first nitrogen-enriched vapor waste stream and the first LP oxygen-rich liquid stream are fed to the mixing column to perform the mixing to form the mixed nitrogen-oxygen fluid stream. The mixed nitrogen-oxygen fluid stream in such embodiments can be a liquid.

More than one nitrogen-enriched waste stream can be utilized in the process. For example, a second nitrogen-enriched waste stream can be output from the LP column. For such embodiments, the first nitrogen-enriched waste stream can a first nitrogen-enriched vapor waste stream and the second nitrogen-enriched waste stream can be a first nitrogen-enriched liquid waste stream. Alternatively, the first nitrogen-enriched waste stream can a first nitrogen-enriched liquid waste stream and the second nitrogen-enriched waste stream can be a first nitrogen-enriched vapor waste stream. For such embodiments, the mixing can be performed via a mixing column so that the first nitrogen-enriched liquid waste stream, the first nitrogen-enriched vapor waste stream and the first LP oxygen-rich liquid stream are fed to the mixing column to perform the mixing to form the mixed nitrogen-oxygen fluid stream. When such a mixing column arrangement is utilized, the first nitrogen-enriched liquid waste stream can be fed adjacent to or at a bottom of the mixing column and the first LP oxygen-rich liquid can be fed adjacent a top of the mixing column. The first nitrogen-enriched vapor stream can be fed adjacent to the bottom of the mixing column. Other embodiments can utilize other mixing column arrangements.

In some embodiments of the process, at least the portion of the refrigeration duty of the second reboiler-condenser for the at least partially condensing of the first argon-rich vapor stream can be an entirety of the refrigeration duty for the at least partially condensing of the first argon-rich vapor stream. It should also be appreciated that the at least partially condensing of the first argon-rich vapor stream can be a complete condensing of the first argon-rich vapor so that a second reboiler-condenser output stream of the second reboiler-condenser is an argon-rich liquid. In other embodiments, the at least partially condensing of the first argon-rich vapor stream may not be a complete condensing (e.g. can condense a pre-selected fraction of the vapor that is less than 100% of the vapor, can condense a substantial portion of the vapor, can condense almost all of the vapor, etc.). For partial condensing of the argon-rich vapor stream, some of the argon-rich output can be a fluid that includes liquid and vapor (or gas).

Embodiments of a separation system are also provided. Embodiments of the system can be configured as an air separation system in some embodiments. The air separation system can be designed for incorporation into a standalone plant or can be configured as a plant for utilization in conjunction with other facilities connected to the plant. Embodiments of the separation system can include a compression system, a first heat exchanger, a first column and a second column. The first column can be a high pressure (HP) column operating at a pressure that is higher than the second column. The second column can be a low pressure (LP) column operating at a pressure that is lower than the first column. The system can also include a first reboiler-condenser and a second reboiler-condenser. The compression system, the first heat exchanger, and the HP column can be positioned and arranged so that a feed gas is compressible via the compression system before the compressed feed gas is fed to the first heat exchanger and at least a first portion of the compressed feed gas is feedable to the HP column after passing through the first heat exchanger. The HP column can be positioned and configured to produce a first HP nitrogen-enriched vapor stream and a first HP oxygen-enriched stream. The first reboiler-condenser can be positioned to receive at least a portion of the first HP nitrogen-enriched vapor to form an HP condensate so that a first portion of the HP condensate is recyclable to the HP column and a second portion of the HP condensate is feedable to the LP column. The LP column can be positioned and configured to output a first nitrogen-rich vapor stream, a first nitrogen-enriched waste stream, a first LP oxygen-rich liquid steam, and a first argon-enriched vapor stream. The first LP oxygen-rich liquid stream can have an oxygen content of at least 98 mol % oxygen. The argon column can be positioned and configured to receive the first argon-enriched vapor stream output from the LP column to form a first argon-rich vapor stream that is feedable to the second reboiler-condenser and an argon-depleted liquid stream that is feedable to the LP column. The second reboiler-condenser can be positioned and configured to at least partially condense the first argon-rich vapor stream. The system can be configured such that the first nitrogen-enriched waste stream output from the LP column is mixable with the first LP oxygen-rich stream output from the LP column for forming a mixed nitrogen-oxygen fluid stream to feed to the second reboiler-condenser to provide at least a portion of a refrigeration duty of the second reboiler-condenser for the at least partially condensing of the first argon-rich vapor stream.

In some embodiments, the HP column, LP column, and argon column can be structured as distillation columns or separation columns. Each column can have multiple stages and utilize packing or not utilize packing. The first and second reboiler-condensers can include one or more heat exchangers to facilitate partial vaporization and condensation of different streams or facilitate complete vaporization and compete condensation of different streams. In some embodiments, the second reboiler-condenser can include multiple heat exchanger units that each process a respective portion of the first argon-rich vapor stream for at least partial condensing of that stream. The heat exchanger units can operate in parallel. In some embodiments utilizing this type of second reboiler-condenser, a first heat exchanger of the multiple heat exchangers can receive the mixed nitrogen-oxygen fluid stream and a second heat exchanger of the multiple heat exchangers can receive a portion of the first HP oxygen-enriched stream. In other embodiments, a first heat exchanger of the multiple heat exchangers and a second heat exchanger of the multiple heat exchangers can receive the mixed nitrogen-oxygen fluid stream and optionally also receive a portion of the first HP oxygen-enriched stream.

Some embodiments of the system can include a mixing column that is positioned and configured to receive the first LP oxygen-rich liquid stream output from the LP column and the first nitrogen-enriched waste stream output from the LP column to form the mixed nitrogen-oxygen fluid stream. Other embodiments of the system can include a mixing column that is positioned and configured to receive the first LP oxygen-rich stream output from the LP column, the first nitrogen-enriched waste stream output from the LP column, and a second nitrogen-enriched waste stream output from the LP column to form the mixed nitrogen-oxygen fluid stream. In such embodiments, the first nitrogen-enriched waste stream can be a first nitrogen-enriched liquid waste stream and the second nitrogen-enriched waste stream can be a first nitrogen-enriched vapor waste stream.

In some embodiments, the system can include a phase separator positioned and configured to receive the mixed nitrogen-oxygen fluid stream so that a liquid portion of the mixed nitrogen-oxygen fluid stream is fed to the second reboiler-condenser.

Embodiments of the system can also include other elements. For example, the system can also include a subcooler positioned and configured so that the second portion of the HP condensate passes through the subcooler before the second portion of the HP condensate is fed to the LP column and the first nitrogen-rich vapor stream passes through the subcooler. The second portion of the HP condensate can be cooled via the subcooler and the first nitrogen-rich vapor stream can be heated via the subcooler. The first nitrogen-rich vapor stream can be a top nitrogen-rich vapor stream output from the LP column.

The system can also include an expander. The system can be configured such that the compressed feed gas is split into multiple flow portions that include the first portion of the compressed feed gas that is feedable to the HP column and a second portion of the compressed feed gas. The expander can be positioned and configured to receive the second portion of the compressed feed gas to reduce the pressure of the second flow portion of the compressed feed gas for feeding it to the LP column.

In other embodiments, there may not be such splitting of the compressed feed gas. For instance, the first portion of the compressed feed gas can be an entirety of the compressed feed gas. As noted above, the feed gas is air (e.g. air obtained from air external to the system or the plant including the system, etc.).

It should be appreciated that different streams of fluid can include vapor, liquid, or a combination of vapor and liquid. Fluid streams that include vapor can include vapor, or gas.

It should be appreciated that the system can use a series of conduits for interconnection of different units so that different streams can be conveyed between different units. Such conduits can include tubing, piping, valves, and other conduit elements. The system can also utilize sensors and at least one controller to monitor operation of the system and/or provide automated or at least partially automated control of the system. Various different sensors (e.g. temperature sensors, pressure sensors, flow sensors, etc.) can be connected to different conduits or system elements.

Other elements can also be included in embodiments of the system. For instance, one or more pumps, vessels, or other units can also be utilized in embodiments of the system. It should be appreciated that embodiments of the system can be structured and configured to utilize at least one embodiment of the process.

Other details, objects, and advantages of our processes utilized to recover fluids (e.g. oxygen, argon and nitrogen) from air, gas separation plants configured to recover nitrogen, argon and/or oxygen from at least one feed gas, air separation plants, air separation systems, systems utilizing multiple columns to recover nitrogen, argon, and oxygen fluids, plants utilizing such systems or processes, and methods of making and using the same will become apparent as the following description of certain exemplary embodiments thereof proceeds.

BRIEF DESCRIPTION OF THE DRAWINGS

Exemplary embodiments of processes utilized to recover fluids (e.g. oxygen, argon and nitrogen) from air, gas separation plants configured to recover nitrogen, argon and/or oxygen from at least one feed gas, air separation plants, air separation systems, systems utilizing multiple columns to recover nitrogen, argon, and oxygen fluids, plants utilizing such systems, and methods of making and using the same are shown in the drawings included herewith. It should be understood that like reference characters used in the drawings may identify like components.

DETAILED DESCRIPTION

Figure 1:
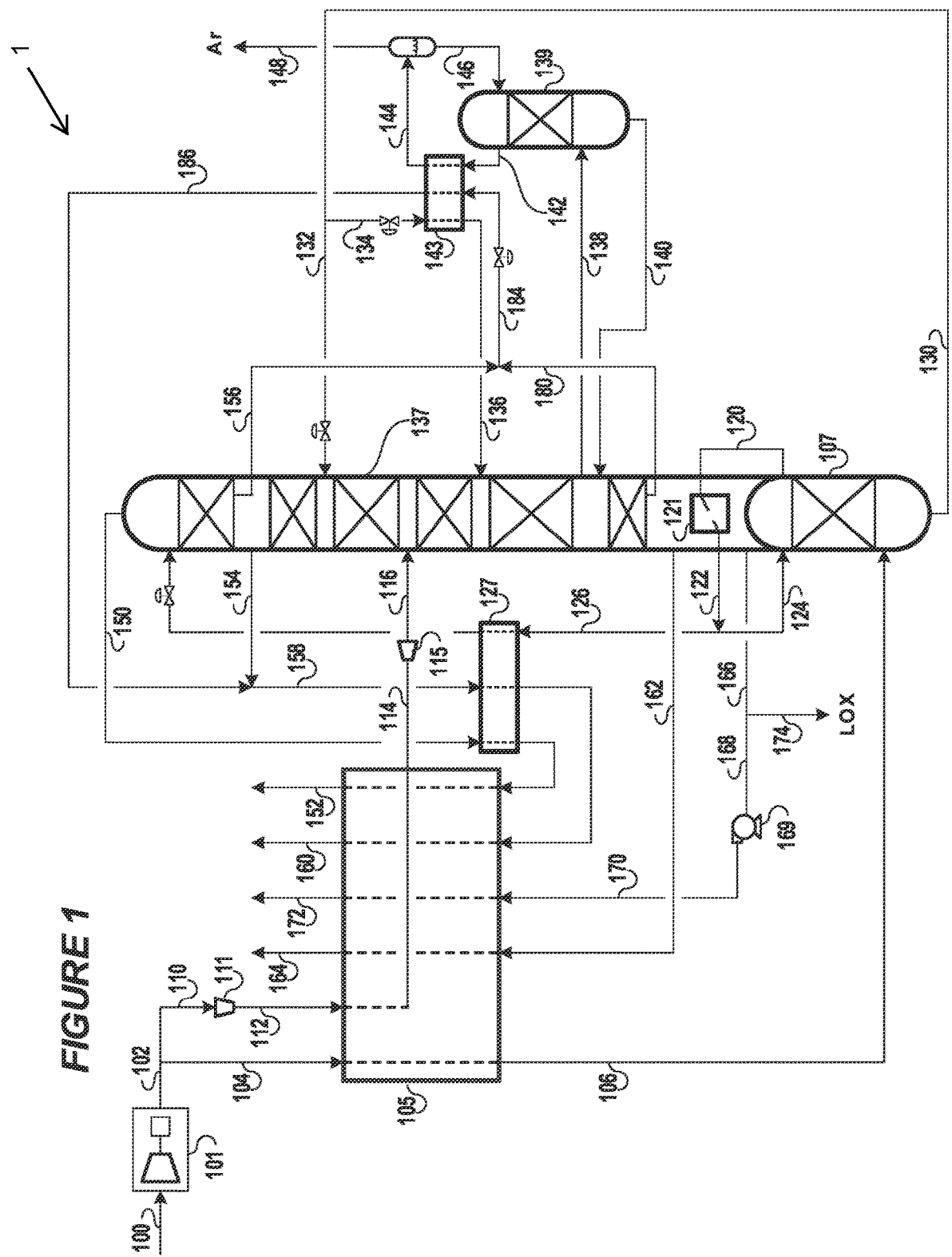
FIG. 1 is a schematic block diagram of a first exemplary embodiment of a plant utilizing a first exemplary embodiment of the air separation process.

Referring to FIGS. 1-6, a plant 1 can be configured to utilize an air separation process that can be configured to facilitate recovery of at least one argon fluid flow and at least one nitrogen fluid flow in addition to one or more oxygen fluid flows. Embodiments of the plant 1 can utilize a controller, such as the exemplary controller shown in FIG. 6, to help monitor and/or control operations of the plant 1. In some embodiments, the plant 1 can be configured as an air separation system or a cryogenic air separation system. The plant 1 can be a standalone facility or be a facility that is incorporated in a larger facility having other plants (e.g. a manufacturing plant for making semiconductor chips, an industrial plant for making goods, a mineral refining facility, etc.).

In some embodiments, the plant 1 can provide one or more nitrogen flows (e.g. flow of nitrogen fluid, flow of nitrogen gas, flow of liquid nitrogen, flow of a combination of nitrogen liquid and nitrogen gas, etc.) and at least one argon flow (e.g. flow of liquid argon, flow of a combination of liquid argon and argon gas, flow of argon gas, etc.) for storage and sale as products or for use by a manufacturing facility that can be connected to the plant 1 or incorporated into the plant 1 (e.g. storage within one or more storage vessels for subsequent use by the facility, etc.). Such nitrogen fluid flows and/or argon fluid flows can also include at least one liquid nitrogen output flow. Some embodiments can also provide an output flow that includes a mixture of nitrogen gas and oxygen gas. Embodiments of the plant 1 can also be configured to provide one or more oxygen flows that can include at least one oxygen gas output flow and at least one liquid oxygen output flow. The oxygen output flows of the plant 1 can be considered waste output flows or can be utilized as other types of product flows (e.g. liquid oxygen product, oxygen gas product, etc.).

Referring to FIGS. 1-5, embodiments of the plant 1 can include a gas feed 100. The feed 100 can be air obtained from the atmosphere external to the plant 1 or a process gas from a facility connected to the plant 1. The feed 100 can be compressed in a compression system 101. The compression system 101 can also include a purification unit for purification of the pressurized feed 100 to remove certain components of the feed after it is compressed. For example, the purification unit can be configured to remove trace components from the feed that may have a relatively high boiling point or be an impurity that may otherwise represent an undesirable impurity that may present an operational issue such as, for example, carbon dioxide ($CO_2$), carbon monoxide (CO), hydrogen ($H_2$), methane ($CH_4$) and/or water ($H_2O$). The purification unit can include one or more adsorbers or one or more absorbers, for example. In some embodiments, the compression system 101 can output the purified, compressed feed as a purified and pressurized gas stream 102 (e.g. a purified and pressurized air feed). In some embodiments, the purified and pressurized gas steam 102 can include, for example, 76-79% by volume nitrogen ($N_2$), 20-22% by volume oxygen ($O_2$), and 0.8%-3% by volume argon (Ar) or 76.59-78.12% by volume $N_2$, 20.5-20.95% by volume $O_2$, and 2.87-0.93% by volume Ar.

The purified and pressurized gas stream 102 can be output from the compression system 101 and subsequently fed to a first heat exchanger 105 via at least one conduit. In some embodiments, the first heat exchanger 105 can be considered a main heat exchanger or a primary heat exchanger in some embodiments.

The purified and pressurized gas stream 102 can be fed directly from the compression system 101 to the first heat exchanger 105 via at least one conduit or can be split into a first portion flow 104 that is fed to the first heat exchanger 105 via at least one conduit and a second portion flow 110 that is fed to a booster compressor 111 via at least one conduit to further pressurize the second portion flow 110 of the purified and pressurized gas stream to form a further pressurized second portion flow 112 before that purified and pressurized gas stream portion is fed to the first heat exchanger 105. A conduit arrangement can include a valve or other type of flow splitting mechanism to split the purified and pressurized gas stream 102 into the first and second portion flows 104 and 110. In some embodiments, the first portion flow 104 can be between 50% and 100% of the entirety of the purified and pressurized gas stream 102 output from the compression system 101 and the second portion flow 110 can be the remaining portion of the purified and pressurized gas stream 102 output from the compression system 101 (e.g. above 0% to 50% of the entirety of the purified and pressurized gas stream 102 output from the compression system 101 for embodiments utilizing the second portion flow 110). In such embodiments, the pressure of the first portion flow 104 can be a pressure of between 5 atmosphere (atm) and 30 atm. The pressure of the second portion flow 110 after it is further pressurized to form the further pressurized second portion flow 112 can be between 5 atm and 85 atm. For instance, in some embodiments, the pressure of the first portion flow 104 can be between 5-15 atm, 5-25 atm, or 10-30 atm, and the pressure of the further pressurized second flow 112 can be greater than 5 atm and less than 85 atm, greater than 10 atm and less than 75 atm.

It should be appreciated that the utilization of the second portion flow 110 and use of the booster compressor 111 can be optional. For example, in some embodiments the entirety of the purified and pressurized gas stream 102 can be fed to the first heat exchanger 105 to undergo cooling therein without undergoing further compression via a booster compressor 111 as the first portion flow 104. In yet other embodiments, a booster compressor can be connected to pressurize the first portion flow 104. For instance, in other embodiments, the entirety of the purified and pressurized gas stream 102 can be further compressed via a booster compressor 111 before the stream is fed to the first heat exchanger 105 to undergo cooling therein.

The first portion flow 104 can be cooled in the first heat exchanger 105 to form a first cooled first heat exchanger output stream 106 that is fed to a high pressure (HP) column 107 of a multiple column assembly (e.g. a column or tower having multiple columns operating at different pressures via at least one high pressure column feed conduit. The HP column 107 can be considered a first column of the multiple column assembly that operates at a highest pressure of the columns of the multiple column assembly. For instance, the HP column 107 can operate at a pressure that is higher than the operational pressure of a second column of the multiple column assembly.

The further pressurized second portion flow 112 can be cooled in the first heat exchanger to form a second cooled first heat exchanger output stream 114 that is fed to a turbo expander 115 via a turbo expander feed conduit extending from the first heat exchanger 105 to the turbo expander 115. The second cooled first heat exchanger output stream 114 can be cooled via the expansion in the turbo expander 115 to form a cooled turbo expander output stream 116 that is subsequently fed from the turbo expander 115 to the low pressure (LP) column 137 via an LP column feed conduit. The cooled turbo expander output stream can be a gaseous stream or a substantially gaseous stream (e.g. be predominantly vapor, be at least 80% by volume vapor, be at least 90% by volume vapor, be entirely vapor, etc.). The LP column 137 can be considered a second column of the multiple column assembly that operates at a pressure that is below the operating pressure of a first column (e.g. the HP column 107). In some embodiments, the LP column 137 can operate at a pressure of between 1.1 atm and 5 atm, between 1.1 atm and 3 atm, and the HP column 107 can operate at a pressure of between 4.5 atm and 15 atm, between 1.1 and 3 atm.

The HP column 107 can be positioned and configured to process the cooled first portion flow 104 of the purified and pressurized gas stream 102 that is fed to the HP column 107 as the first cooled first heat exchanger output stream 106 to form a first HP nitrogen-enriched vapor stream 120 and a first HP oxygen-enriched stream 130. The HP oxygen-enriched stream 130 can be a fluid that is liquid, vapor, or a combination of liquid and vapor. In some embodiments, the HP nitrogen-enriched vapor stream 120 can include 100-99 volume percent (vol. %) nitrogen and the HP oxygen-enriched stream 130 can include 30-40 vol. % oxygen, and 1-3 vol. % argon, and the balance nitrogen (e.g. 69-57 vol. % nitrogen).

The first HP nitrogen-enriched vapor stream 120 can be fed to a first reboiler-condenser 121 to from an HP condensate flow 122. The HP condensate flow 122 can be split into multiple portions via a conduit arrangement that includes at least one valve or other flow splitting mechanism. For instance, a first portion of the HP condensate flow 122 can be output from the first reboiler-condenser 121 and subsequently recycled back to the HP column 107 as an HP reflux stream via a HP reflux stream conduit 124. A second portion of the HP condensate flow 122 can be output from the first reboiler-condenser 121 and then fed to a subcooler 127 via a subcooler feed conduit 126. The subcooler 127 can be a heat exchanger that can cool the second portion of the HP condensate flow so that this second portion is at a lower temperature that is suitable for feeding to the LP column 137 as a nitrogen-enriched LP feed that is fed to the LP column 137 via a nitrogen-enriched LP feed conduit extending from the subcooler 127 to the LP column 137. The second portion of the HP condensate flow can be reduced in pressure for feeding to the LP column (e.g. via a valve of the nitrogen-enriched LP feed conduit extending from the subcooler 127, and/or via a pressure reduction mechanism included in this conduit). The nitrogen-enriched LP feed can be a substantially nitrogen-enriched liquid feed (e.g. be entirely liquid, be at least 90% by volume liquid, be at least 80% by volume liquid, etc.).

The first HP oxygen-enriched stream 130 can be fed to the subcooler 127 (not shown) to undergo cooling. Alternatively, the first HP oxygen-enriched stream 130 can forego such cooling via the subcooler 127. In some embodiments, the first HP oxygen-enriched stream can be passed through an HP oxygen-enriched stream conduit extending from the HP column 107 that is configured so that the HP oxygen-enriched stream output from the HP column 107 can be split into multiple oxygen-enriched flow portions for subsequent use in the plant 1. For example, the HP oxygen stream 130 can be split via at least one valve or other flow splitting mechanism so that a first portion 132 of the HP oxygen-enriched stream 130 and a second portion 134 of the HP oxygen-enriched stream 130 can be fed to different elements of the plant 1.

For example, the first portion 132 of the HP oxygen-enriched stream 130 can be reduced in pressure via a pressure reduction mechanism (e.g. an expander, a valve, etc.) and subsequently fed to the LP column 137 as a substantially liquid oxygen-enriched feed to the LP column 137. The second portion 134 of the HP oxygen-enriched stream can be reduced in pressure via a pressure reduction mechanism (e.g. an expander, a valve, etc.) for feeding to a second reboiler-condenser 143 via a second reboiler-condenser feed conduit. The second reboiler-condenser 143 can vaporize the oxygen-enriched flow fed therein to form a second reboiler-condenser output stream 136 of oxygen-enriched fluid for feeding to the LP column 137. The second reboiler-condenser output stream 136 can include an oxygen-enriched fluid that includes both liquid and vapor phases or is entirely vapor.

Reflux for the LP column 137 can be provided via the nitrogen-enriched LP feed that is fed to the LP column 137 via a nitrogen-enriched LP feed conduit extending from the subcooler 127 to the LP column 137. As discussed above, this nitrogen-enriched LP feed can be formed via the second portion of the HP condensate flow 122 output from the first reboiler-condenser 121. There may be additional liquid provided via one or more of the oxygen-enriched feeds fed to the LP column 137. Rising vapor, or column boil-up for the LP column 137 is also formed via the first reboiler-condenser 121 and is fed to the LP column 137 such that the vapor (or gas) within the LP column 137 flows in countercurrent flow to the liquid fed to the LP column 137 (e.g. the nitrogen-enriched LP feed flows downwardly as the rising vapor flows upwardly in the LP column 137, etc.). The LP column 137 operates to output multiple separated flows of fluid. Some of these flows of fluid can be considered nitrogen waste streams of fluid that may be predominantly comprised of nitrogen gas and/or nitrogen liquid (e.g. be at least one nitrogen-enriched waste stream such as, for example, supplemental vapor waste stream 154, first nitrogen-enriched liquid waste stream 156, and/or first nitrogen-enriched waste vapor stream 256). For example, the LP column 137 can operate to output a top nitrogen-rich vapor output stream 150, a supplemental vapor waste stream 154, a first argon-enriched vapor stream 138, a first LP oxygen-rich vapor stream 162, and a first LP oxygen-rich liquid stream 180. The top nitrogen-rich vapor output stream 150 can include 99-100 vol. % nitrogen and be considered a first nitrogen-rich vapor stream in some embodiments. The supplemental vapor waste stream 154 can include 95-99 vol. % nitrogen and the first argon-enriched vapor stream 138 can include 5-25 vol. % argon, 0-1000 ppm nitrogen, and the balance oxygen (e.g. 74-95 vol. % oxygen) in some embodiments.

There can also be a first nitrogen-enriched liquid waste stream 156 and/or a first nitrogen-enriched vapor waste stream 256 output from the LP column 137. The first nitrogen-enriched liquid waste stream 156 can include 95-99 vol. % nitrogen and the first nitrogen-enriched vapor waste stream 256 can include 95-99 vol. % nitrogen in some embodiments.

In some embodiments, an optional second LP oxygen-rich liquid stream 166 can also be output from the LP column 137. The first LP oxygen-rich vapor stream 162, first LP oxygen-rich liquid stream 180, and optional second LP oxygen-rich liquid stream 166 can be output at or adjacent the bottom of the LP column 137. The oxygen-rich liquid and vapor streams (e.g. streams 162, 180 and optional stream 166) can be positioned so that the oxygen concentration in each and every one of these streams is at least 98 mole percent (mol %) oxygen or is greater than or equal to 99.5 mol % oxygen.

In some instances, the oxygen concentration of the second LP oxygen-rich liquid stream 166 can have an oxygen concentration that is greater than the oxygen concentration of the first LP oxygen-rich liquid stream 180 and the first LP oxygen-rich vapor stream 162. For example, this can be a desired oxygen concentration for the second LP oxygen-rich liquid stream 166 in situations where there may be one or more stages (e.g. from 1-7 stages or 1-5 stages, etc.) between the takeoff positions of the first LP oxygen-rich vapor stream 162 and the first LP oxygen-rich liquid stream 180 to be removed from the LP column 137 near the bottom of the LP column but not at the bottom of the LP column.

The supplemental vapor waste stream 154, first nitrogen-enriched liquid waste stream 156, and/or first nitrogen-enriched vapor waste stream 256, can be output from the LP column 137 at locations positioned between where the oxygen-enriched fluid output streams are output from the LP column 137 and the location at which the top nitrogen-enriched vapor output stream 150 is output from the LP column 137. The supplemental vapor waste stream 154 and first nitrogen-enriched liquid waste stream 156, and/or first nitrogen-enriched vapor waste stream 256, can all be output from the LP column 137 at locations positioned below the location at which the second portion of the HP condensate flow fed as the nitrogen-enriched LP feed to the LP column 137 enters the LP column 137. The supplemental vapor waste stream 154 and first nitrogen-enriched liquid waste stream 156, and/or first nitrogen-enriched vapor waste stream 256, can all be output from the LP column 137 at locations positioned above any other LP column feed location. For example, the supplemental vapor waste stream 154 and first nitrogen-enriched liquid waste stream 156, and/or first nitrogen-enriched vapor waste stream 256, can all be output from the LP column 137 at locations that are above locations at which the cooled and pressure reduced first portion 132 of the HP oxygen-enriched stream and the optional second reboiler-condenser output stream 136 containing oxygen-enriched fluid are fed into the LP column 137.

The first argon-enriched vapor stream 138 can be output from the LP column 137 at a location above the positions at which the oxygen-rich output streams are located while also being below the position at which the top nitrogen-rich vapor output stream 150 is output from the LP column 137. For example, the first argon-enriched vapor stream 138 can be positioned below all the locations at which oxygen-enriched LP feed fluid is fed to the LP column (e.g. below locations at which the cooled and pressure reduced first portion 132 of the HP oxygen-enriched stream and the optional second reboiler-condenser output stream 136 containing oxygen-enriched fluid are fed into the LP column 137) while also being above locations at which the oxygen-rich output streams are located.

The first argon-enriched vapor stream 138 output from the LP column 137 can be fed to an argon column 139 as a bottom feed to this column (e.g. fed at a bottom of the argon column 139 or at a lower portion of the argon column 139 adjacent to the bottom of the argon column 139) via an argon-enriched vapor bottom feed conduit. The vapor ascending the argon column 139 can exit the top (or adjacent the top) of the argon column as a first argon-rich vapor stream 142. The first argon-rich vapor stream 142 can have a higher concentration of argon as compared to the first argon-enriched vapor stream 138 fed to the argon column 139. For instance, the first argon-rich vapor stream 142 can be 100-95 vol. % argon. In some embodiments, the first argon-rich vapor stream 12 can include 0-4 vol. % oxygen, 0-0.5 vol. % nitrogen, and the balance argon (e.g. 100-95.5 vol. % argon).

The first argon-rich vapor stream 142 output from the argon column 139 can be fed to the second reboiler-condenser 143 via an argon vapor second reboiler-condenser feed conduit. The argon-rich vapor of the first argon-rich vapor stream 142 can be substantially condensed (e.g. entirely condensed, almost entirely condensed, have at least 95% of this vapor condensed, etc.) in the second reboiler-condenser 143 and output as a second reboiler-condenser output stream 144 of argon-rich fluid. The second reboiler-condenser output stream 144 of argon-rich fluid can be optionally fed from the second reboiler-condenser to a phase separator via an argon phase separator feed conduit. For instance, the phase separator can be utilized in embodiments where the output stream 144 of the argon-rich fluid includes vapor, or gas, in addition to liquid. The phase separator (when utilized) can process the second reboiler-condenser output stream 144 of argon-rich fluid to form an argon gas product output stream 148 and a liquid argon reflux stream 146. In some embodiments, the argon gas product output stream 148 can be a flow of argon gas product that is 3-6 vol. % of the flow of the first argon-enriched vapor stream 138.

The argon gas product output stream 148 can be conveyed via an argon product output conduit so that the argon gas product can be further processed so that it can be stored in a storage vessel or can be conveyed to a facility for utilization of the argon product gas. The liquid argon reflux stream 146 can fed from the phase separator to the argon column 139 via an argon column reflux feed conduit. The liquid argon reflux stream 146 can be fed to the argon column 139 so that the liquid argon flows downwardly within the argon column 139. The argon-depleted liquid can be output from adjacent the bottom or at the bottom of the argon column 139 for being fed to the LP column 137 as an argon liquid stream feed 140 to the LP column 137 via an argon liquid stream feed conduit. The argon liquid stream feed 140 can be fed into the LP column 137 at a location that is below the location at which the first argon-enriched vapor stream 138 is output from the LP column 137 or can be located at a position that is at or near the position at which the first argon-enriched vapor stream 138 is output from the LP column 137. This location at which the argon liquid stream feed 140 is fed to the LP column 137 can also be above all the locations at which the oxygen-rich fluids are output from the LP column 137.

The nitrogen-rich vapor output stream 150 can be fed to the subcooler 127 to facilitate cooling of fluids passed into the subcooler 127 for cooling. For example, the nitrogen-rich vapor output stream 150 can be passed through the subcooler 127 as a cooling medium used to cool the second portion of the HP condensate flow 122 fed to the subcooler 127 to be cooled therein. As a result of cooling one or more fluids within the subcooler, the nitrogen-rich vapor output stream 150 is warmed to an increased temperature.

The nitrogen-rich vapor output stream 150 can then be routed from the subcooler 127 to the first heat exchanger 105 to function as a cooling medium within the first heat exchanger 105 by absorbing heat from one or more fluids passed through the first heat exchanger 105 (e.g. the one or more flow portions of the purified and pressurized gas stream 102). The further warmed nitrogen-rich vapor output stream 150 can be output from the first heat exchanger 105 as a nitrogen-rich vapor output flow 152 that is output for use in a facility connected to the plaint 1.

The first LP oxygen-rich vapor stream 162 can be output from the LP column 137 and fed to the first heat exchanger 105 to also function as a cooling medium therein for cooling one or more fluids passed through the first heat exchange 105 by absorbing heat from those one or more fluids (e.g. the one or more flow portions of the purified and pressurized gas stream 102). This first LP oxygen-rich vapor stream 162 can then be output from the first heat exchanger 105 via a first oxygen-rich vapor output stream 164 as a waste to atmosphere, a regeneration gas that can be used in the plant 1 or a facility connected to the plan 1, or as a product gas.

The optional second LP oxygen-rich liquid stream 166 can be directed to liquid storage for storage of the LP oxygen-rich liquid. In some embodiments, the second LP oxygen-rich liquid stream 166 can be split via a valve or other type of flow splitting mechanism so a first portion of the second LP oxygen-rich liquid stream 166 is provided as an LP oxygen-rich liquid output stream 174 for storage in a storage vessel. A second portion of the second LP oxygen-rich liquid stream 166 can be fed to a pump 169 via a pump feed conduit 168 for increasing the pressure of the second portion of the LP oxygen-rich liquid for feeding to the first heat exchanger 105 via another liquid oxygen feed conduit 170 so that this liquid oxygen can also function as a cooling medium therein for cooling one or more fluids passed through the first heat exchange 105 by absorbing heat from those one or more fluids (e.g. the one or more flow portions of the purified and pressurized gas stream 102). In the first heat exchanger 105, this liquid oxygen may also be heated such that it is vaporized and then further warmed before the oxygen flow is output from the first heat exchanger 105 as second LP oxygen-rich output stream 172 for conveying to a facility for use of the oxygen (e.g. for incorporation within a fluid fed to a combustor or a burner, etc.).

As can be appreciated from FIGS. 1-5, the first LP oxygen-rich liquid stream 180 output from the LP column 137 can be utilized differently in different embodiments of the plant 1. For the embodiments of all of FIGS. 1-5, the discussion of the common features that utilize the same reference numbers provided herein is the same. Differences related to the different utilizations of the first LP oxygen-rich liquid stream 180 output from the LP column 137 that are shown in the different embodiments illustrated in FIGS. 1-5 are discussed with more specificity below.

Referring to the exemplary embodiment shown in FIG. 1, the first LP oxygen-rich liquid stream 180 output from the LP column 137 can be mixed with the first nitrogen-enriched liquid waste stream 156. In some embodiments, a mixing device that receives these fluids output from the LP column 137 can be positioned to receive these flows of fluid for mixing (represented by meeting arrowheads in FIG. 1). The mixed nitrogen-enriched waste liquid and LP oxygen-rich liquid stream that is formed can be a mixed nitrogen and oxygen (also referred to as a mixed nitrogen-oxygen) fluid stream 184 that is fed to the second reboiler-condenser 143. This mixed nitrogen-oxygen fluid stream 184 can be reduced in pressure before it is fed to the second reboiler-condenser 143 (e.g. via a valve, expander, or other type of pressure reduction mechanism). In the second reboiler-condenser 143, the mixed nitrogen-oxygen fluid stream 184 can be vaporized to form an output stream that is entirely gas or is substantially gas (e.g. at least 95% gas by volume, etc.).

In some embodiments, the mixed nitrogen-oxygen fluid stream 184 fed to the second reboiler-condenser 143 can provide all of the condensation duty or refrigeration duty in the second reboiler-condenser 143. This can be the case for all operating conditions or in at least some operating conditions of the plant. In such situations, there is no need for the second portion 134 of the HP oxygen-enriched stream 130 to be formed via splitting. Thus, the plant 1 can be operated so that this second portion 134 of the HP oxygen-enriched stream 130 is not formed and the entirety of the HP oxygen-enriched stream 130 is directed to the LP column 137.

In other situations or embodiments, a portion (but not 100%) of the duty of the second reboiler-condenser 143 may be provided by the mixed nitrogen-oxygen fluid stream 184 fed to the second reboiler-condenser 143. In such a situation, formation of the second portion 134 of the HP oxygen-enriched stream 130 for feeding to the second reboiler-condenser 143 may be utilized to provide additional condensation duty or refrigeration duty for the second reboiler-condenser 143.

The formed mixed nitrogen and oxygen vapor can be output from the second reboiler-condenser 143 as a mixed nitrogen and oxygen gas stream 186. The mixed nitrogen and oxygen gas stream 186 can then be mixed with the supplemental vapor waste stream 154 (if or when present) to form an oxygen and nitrogen mixed feed stream 158 for feeding to the subcooler 127 and then the first heat exchanger 105 so that this stream 158 can function as a cooling medium therein by absorbing heat from fluid passed through the subcooler 127 (e.g. absorbing heat from the second portion of the HP condensate flow 122 fed to the subcooler 127 to provide cooling) and the first heat exchanger 105 (e.g. absorbing heat from the one or more flow portions of the purified and pressurized gas stream 102). The mixed nitrogen and oxygen gas stream can be output from the first heat exchanger 105 as a mixed nitrogen and oxygen output stream 160, which can be used as a regeneration gas for a purification unit or otherwise conveyed for use by another plant element or facility connected to the plant 1 or can be conveyed for emission out of the plant 1.

Figure 2:
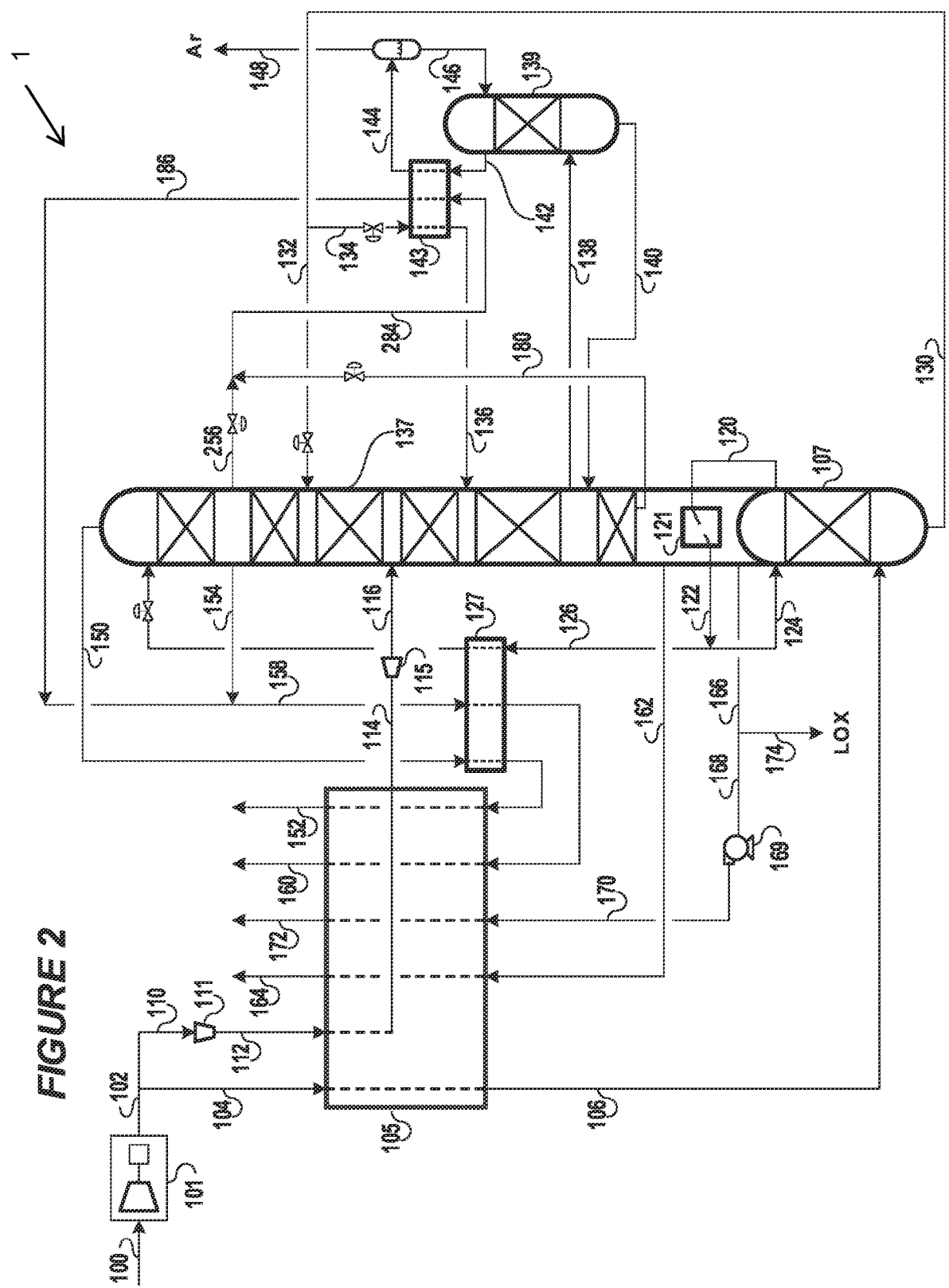
FIG. 2 is a schematic block diagram of a second exemplary embodiment of a plant utilizing a second exemplary embodiment of the air separation process.

Referring to the exemplary embodiment shown in FIG. 2, the first LP oxygen-rich liquid stream 180 output from the LP column 137 can be mixed with the first nitrogen-enriched vapor waste stream 256 output from the LP column 137 to form a nitrogen-oxygen mixed fluid stream 284 that includes a mixture of vapor and liquid. In some embodiments, this mixing can occur via a mixing device to which the streams can be fed, which is represented in FIG. 2 by meeting arrowheads illustrated therein. The first LP oxygen-rich liquid stream 180 and the first nitrogen-enriched vapor waste stream 256 can each undergo a reduction in pressure (e.g. via an expander, valve, or other pressure reduction mechanism) before these streams are mixed together. The nitrogen-oxygen mixed fluid stream 284 can be fed to the second reboiler-condenser 143. In the second reboiler-condenser 143, the nitrogen-oxygen mixed fluid stream 284 can be heated such that the liquid within this stream is vaporized to form the mixed nitrogen and oxygen gas stream 186 that can be output from the second rebuilder-condenser 143.

The nitrogen-oxygen mixed fluid stream 284 fed to the second reboiler-condenser 143 can provide all of the condensation duty or refrigeration duty in the second reboiler-condenser 143 in some embodiments. This can be the case for all operating conditions or in at least some operating conditions of the plant 1. In such situations, there is no need for the second portion 134 of the HP oxygen-enriched stream 130 to be formed via splitting. Thus, the plant 1 can be operated so that this second portion 134 of the HP oxygen-enriched stream 130 is not formed and the entirety of the HP oxygen-enriched stream 130 is directed to the LP column 137.

In other situations or embodiments, a portion (but not 100%) of the duty of the second reboiler-condenser 143 may be provided by the nitrogen-oxygen mixed fluid stream 284 fed to the second reboiler-condenser 143. In such a situation, formation of the second portion 134 of the HP oxygen-enriched stream 130 for feeding to the second reboiler-condenser 143 may be utilized to provide additional condensation duty or refrigeration duty for the second reboiler-condenser 143.

The formed mixed nitrogen and oxygen vapor can be output from the second reboiler-condenser 143 as a mixed nitrogen and oxygen gas stream 186. The mixed nitrogen and oxygen gas stream 186 can then be mixed with the supplemental vapor waste stream 154 (if or when present) to form an oxygen and nitrogen mixed feed stream 158 for feeding to the subcooler 127 and then the first heat exchanger 105 so that this stream 158 can function as a cooling medium therein by absorbing heat from fluid passed through the subcooler 127 (e.g. absorbing heat from the second portion of the HP condensate flow 122 fed to the subcooler 127 to provide cooling) and the first heat exchanger 105 (e.g. absorbing heat from the one or more flow portions of the purified and pressurized gas stream 102). The mixed nitrogen and oxygen gas stream can be output from the first heat exchanger 105 as a mixed nitrogen and oxygen output stream 160, which can be conveyed for use as a regeneration gas, etc. or for emission out of the plant 1.

Figure 3:
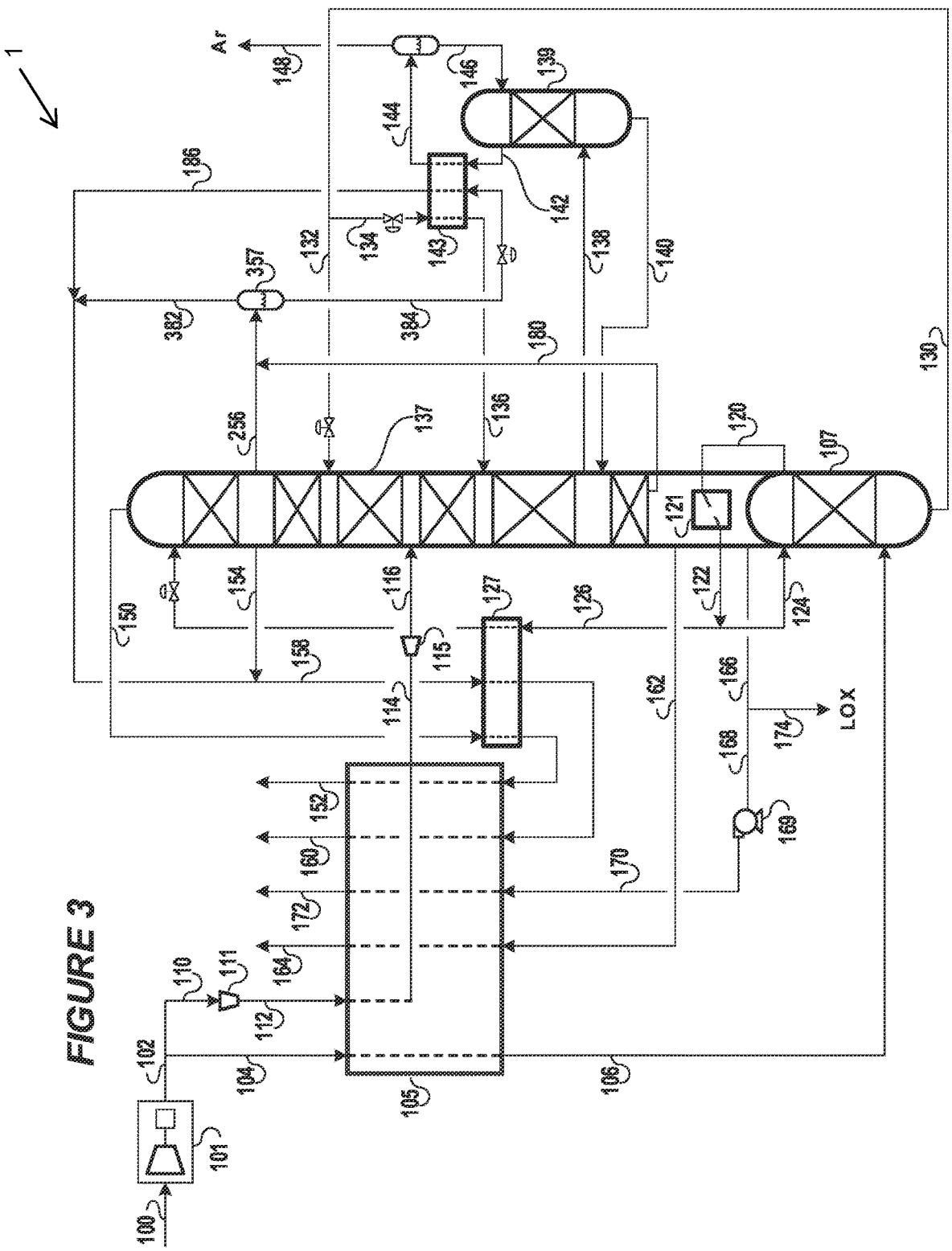
FIG. 3 is a schematic block diagram of a third exemplary embodiment of a plant utilizing a third exemplary embodiment of the air separation process.
Figure 4:
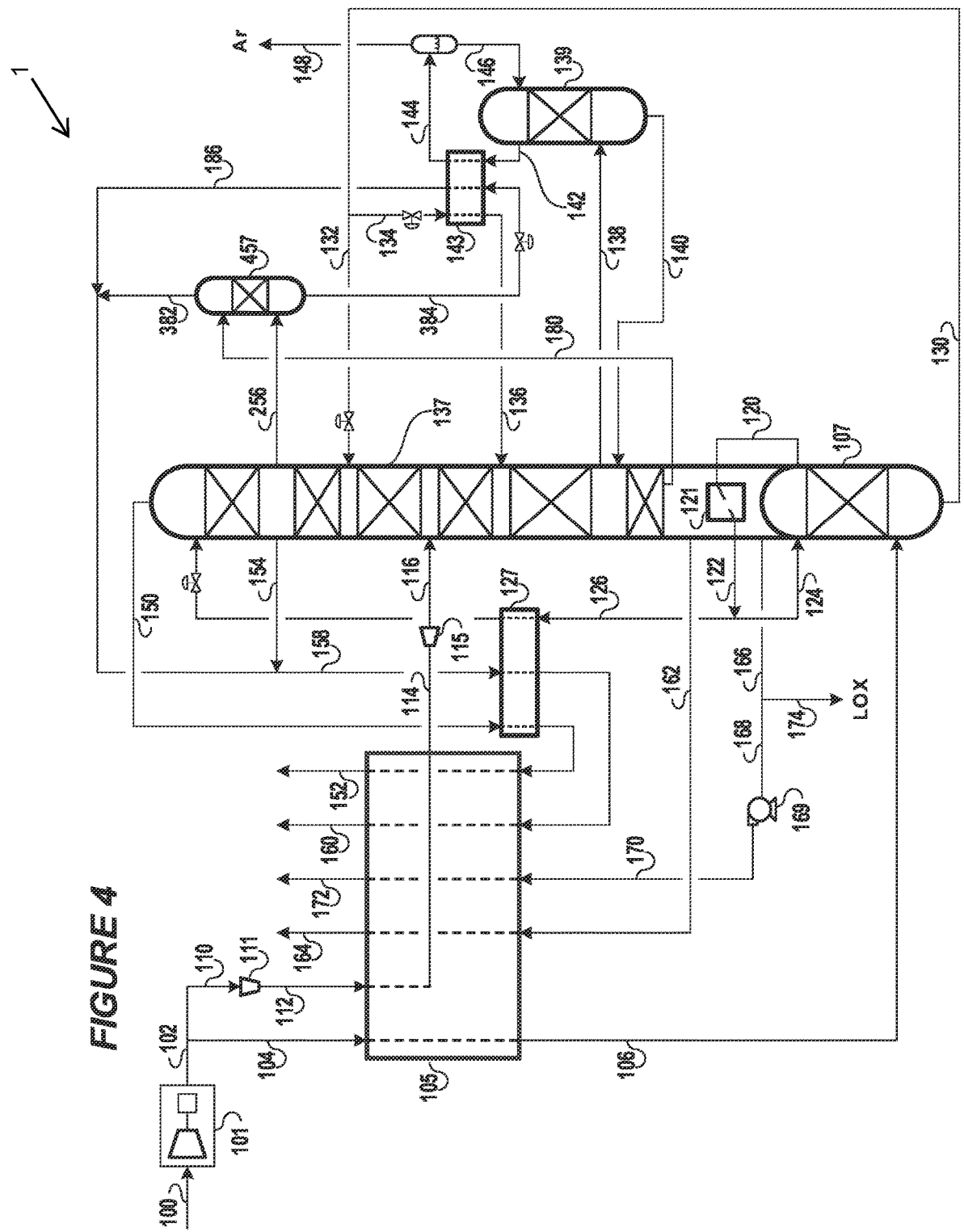
FIG. 4 is a schematic block diagram of a fourth exemplary embodiment of a plant utilizing a fourth exemplary embodiment of the air separation process.
Figure 5:
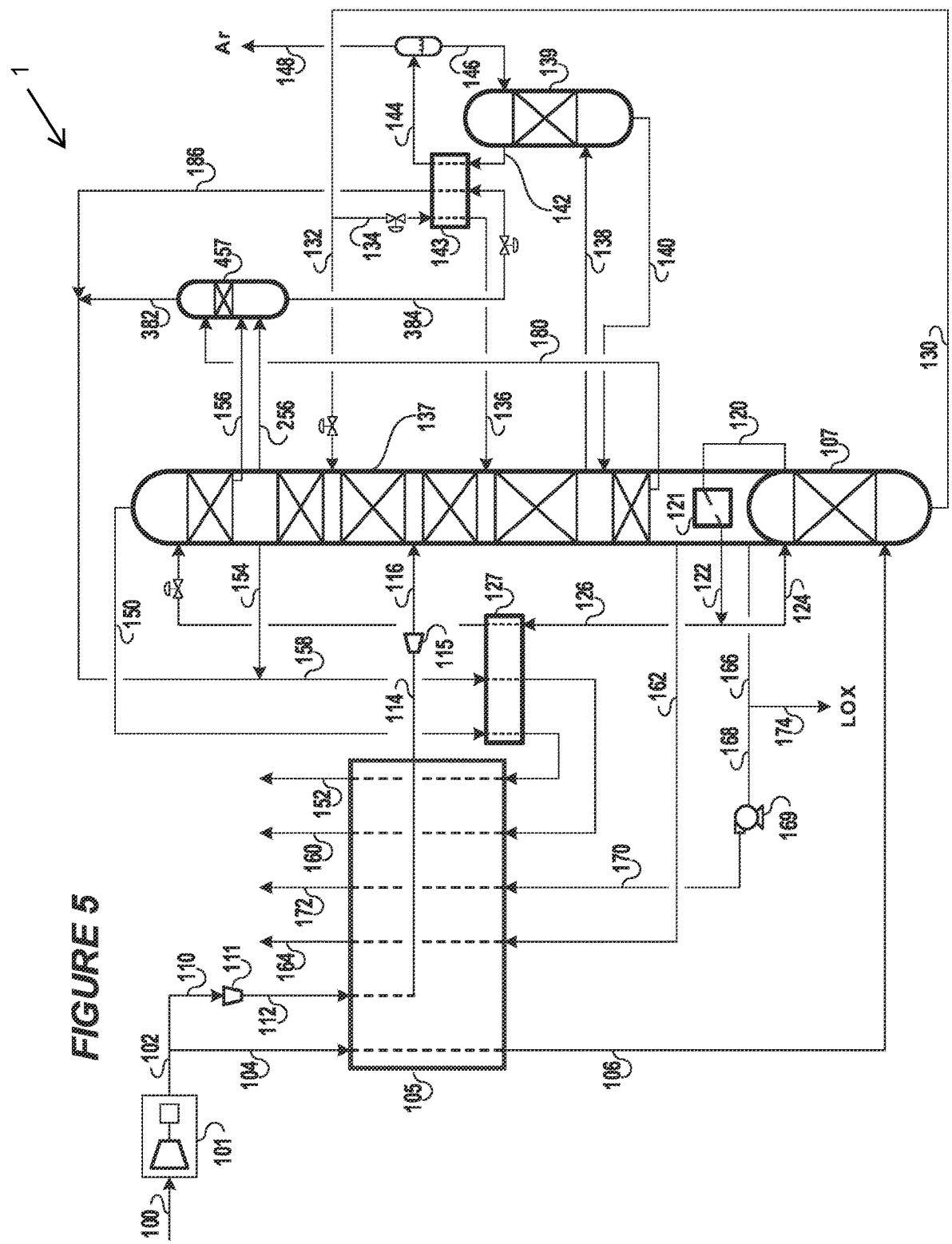
FIG. 5 is a schematic block diagram of a fifth exemplary embodiment of a plant utilizing a fifth exemplary embodiment of the air separation process.
Figure 6:
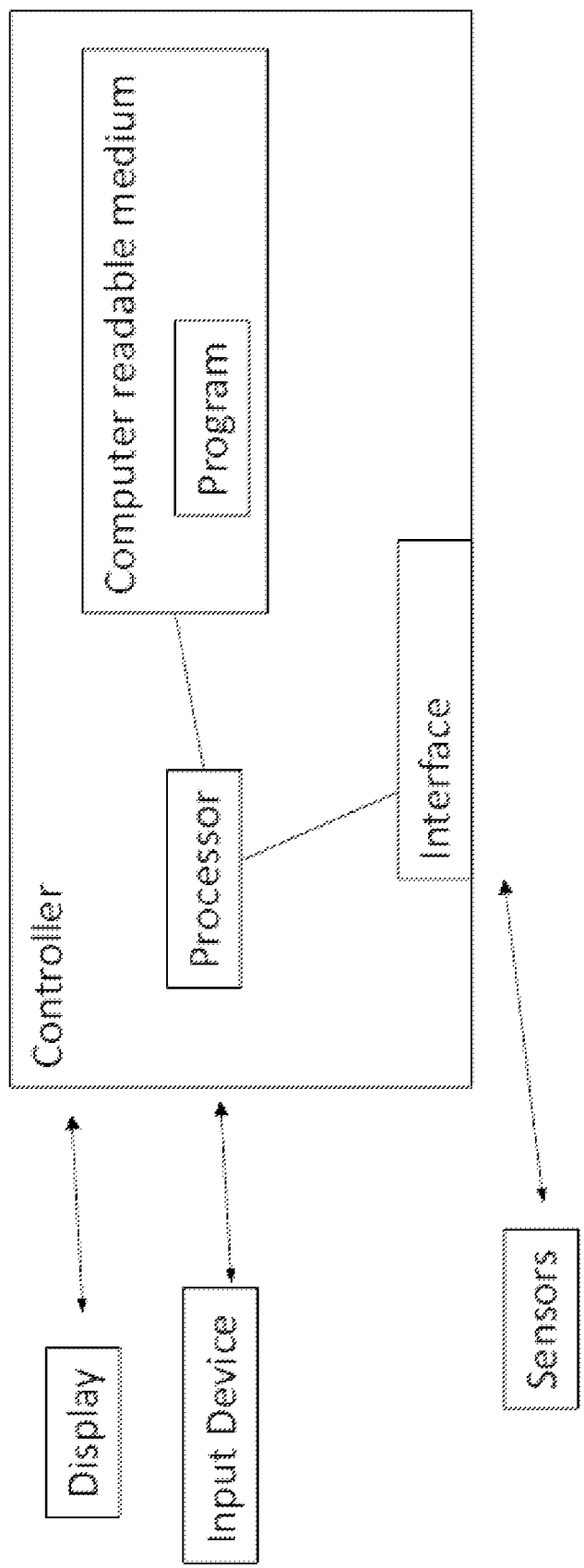
FIG. 6 is a schematic block diagram of an exemplary controller that can be utilized in the embodiments of the plants shown in FIGS. 1-5.

In a preferred operational situation for the embodiment of FIG. 2 as well the exemplary embodiments of FIGS. 3, 4, and 5, the plant 1 can be operated to minimize the amount of fluid in the supplemental vapor waste stream 154 so that as much of the nitrogen-enriched vapor as feasible is output from the LP column 137 as the first nitrogen-enriched waste vapor stream 256 and top nitrogen-rich vapor output stream 150. In some operational situations, there may be no flow of any supplemental vapor waste stream 154. In other situations, the supplemental vapor waste stream 154 can be minimized to keep this flow as low as possible to meet a certain set of desired operational design criteria.

Referring to the exemplary embodiment shown in FIG. 3, the first LP oxygen-rich liquid stream 180 output from the LP column 137 can be mixed with the first nitrogen-enriched vapor waste stream 256 output from the LP column 137 to form a nitrogen-oxygen mixed fluid stream that includes a mixture of vapor and liquid. In some embodiments, this mixing can occur via a mixing device to which the streams can be fed, which is represented in FIG. 3 by the arrowhead of the first LP oxygen-rich liquid stream 180 output meeting the illustrated line for the first nitrogen-enriched vapor waste stream 256.

In some embodiments, the first LP oxygen-rich liquid stream 180 and the first nitrogen-enriched vapor waste stream 256 can each undergo a reduction in pressure (e.g. via an expander or other pressure reduction mechanism) before these streams are mixed together. However, it is contemplated that most embodiments would not utilize such a pressure reduction.

For the embodiment of FIG. 3, the nitrogen-oxygen mixed fluid stream can be fed to a fluid phase separator 357 to separate the liquid and vapor phases of this mixed stream. A waste vapor offtake flow 382 is output from the phase separator 357. A nitrogen-oxygen mixed fluid 384 is also output from the phase separator 357. This fluid can be entirely liquid. The nitrogen-oxygen mixed fluid 384 is fed from the phase separator 357 to the second reboiler-condenser 143.

In the second reboiler-condenser 143, the nitrogen-oxygen mixed fluid 384 can be heated such that the liquid within this fluid is vaporized to form the mixed nitrogen and oxygen gas stream 186 that can be output from the second rebuilder-condenser 143.

The nitrogen-oxygen mixed fluid 384 fed to the second reboiler-condenser 143 can provide all of the condensation duty or refrigeration duty in the second reboiler-condenser 143 in some embodiments. This can be the case for all operating conditions or in at least some operating conditions of the plant 1. In such situations, there is no need for the second portion 134 of the HP oxygen-enriched stream 130 to be formed via splitting. Thus, the plant 1 can be operated so that this second portion 134 of the HP oxygen-enriched stream 130 is not formed and the entirety of the HP oxygen-enriched stream 130 is directed to the LP column 137.

In other situations or embodiments, a portion (but not 100%) of the duty of the second reboiler-condenser 143 may be provided by the nitrogen-oxygen mixed fluid 384 fed to the second reboiler-condenser 143. In such a situation, formation of the second portion 134 of the HP oxygen-enriched stream 130 for feeding to the second reboiler-condenser 143 may be utilized to provide additional condensation duty or refrigeration duty for the second reboiler-condenser 143.

The formed mixed nitrogen and oxygen vapor can be output from the second reboiler-condenser 143 as a mixed nitrogen and oxygen gas stream 186. The mixed nitrogen and oxygen gas stream 186 can then be mixed with waste vapor takeoff 382 output from the phase separator 357 and the supplemental vapor waste stream 154 (if or when present) to form an oxygen and nitrogen mixed feed stream 158 for feeding to the subcooler 127 and then the first heat exchanger 105 (in series) so that this stream 158 can function as a cooling medium by absorbing heat from fluid passed through the subcooler 127 (e.g. absorbing heat from the second portion of the HP condensate flow 122 fed to the subcooler 127 to provide cooling) and the first heat exchanger 105 (e.g. absorbing heat from the one or more flow portions of the purified and pressurized gas stream 102). The mixed nitrogen and oxygen gas stream can be output from the first heat exchanger 105 as a mixed nitrogen and oxygen output stream 160, which can be used as a regeneration gas or other process gas for a plant element or other element of a facility connected to the plant etc. or be conveyed for emission out of the plant 1.

As mentioned previously, in a preferred operational situation for the embodiment of FIG. 3 (as well the exemplary embodiments of FIGS. 2, 4 and 5), the plant 1 can be operated to minimize the amount of fluid in the supplemental vapor waste stream 154 so that as much of the nitrogen-enriched vapor as feasible is output from the LP column 137 as the first nitrogen-enriched waste vapor stream 256 and top nitrogen-rich vapor output stream 150. In some operational situations, there may be no flow of any supplemental vapor waste stream 154. In such situations, the first nitrogen-enriched waste vapor stream 256 can be considered the first and possibly only nitrogen-enriched waste vapor stream.

Referring to FIG. 4, the first LP oxygen-rich liquid stream 180 output from the LP column 137 and the first nitrogen-enriched vapor waste stream 256 output from the LP column 137 can be fed to a mixing column 457 to form nitrogen-oxygen mixed fluid 384 and waste vapor offtake flow 382.

In some embodiments, the first LP oxygen-rich liquid stream 180 and the first nitrogen-enriched vapor waste stream 256 can each undergo a reduction in pressure (e.g. via an expander or other pressure reduction mechanism) before these streams are fed to the mixing column 457. However, it is contemplated that such pressure reduction will not be utilized in most embodiments.

The first LP oxygen-rich liquid stream 180 can be fed to the upper portion of the mixing column 457 (e.g. the top or adjacent the top of this column) for flowing downwardly through the mixing column 457. The first nitrogen-enriched vapor waste stream 256 output from the LP column 137 can be fed to a lower portion of the mixing column 457 (e.g. a position adjacent to the bottom of the mixing column, such as a position at the bottom or near the bottom of this column) for flowing upwardly through the mixing column 457 in cross-current flow with the oxygen-rich liquid passing through the mixing column 457.

For the embodiment of FIG. 4, the nitrogen-oxygen mixed fluid 384 output from the mixing column 457 is entirely liquid or is almost entirely liquid (e.g. within 1 vol. % of being entirely liquid). The nitrogen-oxygen mixed fluid 384 can be fed from the mixing column 457 to the second reboiler-condenser 143. In some embodiments, the nitrogen-oxygen mixed fluid 384 can be reduced in pressure before being fed to the second reboiler-condenser 143 via an expander, a valve, or other pressure reduction mechanism. In the second reboiler-condenser 143, the nitrogen-oxygen mixed fluid 384 can be heated such that the liquid within this fluid is vaporized to form the mixed nitrogen and oxygen gas stream 186 that can be output from the second rebuilder-condenser 143.

The nitrogen-oxygen mixed fluid 384 fed to the second reboiler-condenser 143 can provide all of the condensation duty or refrigeration duty in the second reboiler-condenser 143 in some embodiments that utilize a mixing column 457 such as the embodiment shown in FIG. 4. This can be the case for all operating conditions or in at least some operating conditions of the plant 1. In such situations, there is no need for the second portion 134 of the HP oxygen-enriched stream 130 to be formed via splitting. Thus, the plant 1 can be operated so that this second portion 134 of the HP oxygen-enriched stream 130 is not formed and the entirety of the HP oxygen-enriched stream 130 is directed to the LP column 137.

In other situations or embodiments, a portion (but not 100%) of the duty of the second reboiler-condenser 143 may be provided by the nitrogen-oxygen mixed fluid 384 fed from the mixing column 457 to the second reboiler-condenser 143. In such a situation, formation of the second portion 134 of the HP oxygen-enriched stream 130 for feeding to the second reboiler-condenser 143 may be utilized to provide additional condensation duty or refrigeration duty for the second reboiler-condenser 143.

The formed mixed nitrogen and oxygen vapor can be output from the second reboiler-condenser 143 as a mixed nitrogen and oxygen gas stream 186. The mixed nitrogen and oxygen gas stream 186 can then be mixed with waste vapor takeoff 382 output from the mixing column 457 and the supplemental vapor waste stream 154 (if or when present) to form an oxygen and nitrogen mixed feed stream 158 for feeding to the subcooler 127 and then the first heat exchanger 105 (in series) so that this stream 158 can function as a cooling medium by absorbing heat from fluid passed through the subcooler 127 (e.g. absorbing heat from the second portion of the HP condensate flow 122 fed to the subcooler 127 to provide cooling) and the first heat exchanger 105 (e.g. absorbing heat from the one or more flow portions of the purified and pressurized gas stream 102). The mixed nitrogen and oxygen gas stream can be output from the first heat exchanger 105 as a mixed nitrogen and oxygen output stream 160, which can be conveyed for use as a regeneration gas etc. or for emission out of the plant 1.

As mentioned previously, in a preferred operational situation for the embodiment of FIG. 4 (as well the exemplary embodiments of FIGS. 2, 3, and 5), the plant 1 can be operated to minimize the amount of fluid in the supplemental vapor waste stream 154 so that as much of the nitrogen-rich vapor as feasible is output from the LP column 137 as the first nitrogen-enriched waste vapor stream 256 and top nitrogen-rich vapor output stream 150. In some operational situations, there may be no flow of any supplemental vapor waste stream 154. In such situations, the first nitrogen-enriched waste vapor stream 256 can be considered the first and possibly only nitrogen-enriched waste vapor stream. In other situations, the supplemental vapor waste stream 154 can be minimized to keep this flow as low as possible to meet a certain set of desired operational design criteria.

The mixing column 457 utilized in the exemplary embodiment illustrated in FIG. 4 can replace the phase separator 357 and any mixing device of the embodiment illustrated in FIG. 3 for forming the nitrogen-oxygen mixed fluid 384 and waste vapor offtake 382 streams so that only the mixing column 457 is used in place of these mechanisms. We have found that use of the mixing column 457 can provide a more reversible mixing as compared to use of a single-stage phase separator, such as the phase separator 357 shown in FIG. 3. As a result, the nitrogen-oxygen mixed fluid 384 output from the mixing column 457 can provide a fluid that has a greater concentration of nitrogen while the waste vapor offtake 382 has a greater concentration of oxygen as compared to these flows output from the phase separator 357 in the embodiment shown in FIG. 3.

Referring to FIG. 5, the first LP oxygen-rich liquid stream 180 output from the LP column 137 can be mixed with multiple nitrogen-enriched waste streams (e.g. at least two nitrogen-enriched waste streams including first and second nitrogen-enriched waste streams, etc.). The mixing of the multiple nitrogen-enriched waste streams mixed with the first LP oxygen-rich liquid stream 180 can include the first nitrogen-enriched liquid waste stream 156 and the first nitrogen-enriched vapor waste stream 256 being mixed with the first LP oxygen-rich liquid stream 180 by use of a mixing column 457 to form a nitrogen-oxygen mixed fluid 384 and waste vapor offtake flow 382. In such embodiments, the first nitrogen-enriched waste stream can be considered the first nitrogen-enriched vapor waste stream 256 and the second nitrogen-enriched waste stream can be considered the first nitrogen-enriched liquid waste stream 156 or vice versa.

In some embodiments, the first LP oxygen-rich liquid stream 180, the first nitrogen-enriched liquid waste stream 156, and/or first nitrogen-enriched vapor waste stream 256 can each undergo a reduction in pressure (e.g. via an expander, valve, or other pressure reduction mechanism) before these streams are fed to the mixing column 457. However, it is contemplated that most embodiments will not utilize such a pressure reduction.

The first LP oxygen-rich liquid stream 180 can be fed to the upper portion of the mixing column 457 (e.g. adjacent the top of the column by being fed at the top or near the top of this column) for flowing downwardly through the mixing column 457. The first nitrogen-enriched vapor waste stream 256 output from the LP column 137 can be fed to a lower portion of the mixing column 457 (e.g. the bottom or near the bottom of this column) for flowing upwardly through the mixing column 457 in cross-current flow with the oxygen-enriched liquid passing through the mixing column 457. The first nitrogen-enriched liquid waste stream 156 can be fed adjacent the bottom of the mixing column 457 (e.g. at the bottom or near the bottom of this column) for mixing with the oxygen-rich liquid passing through the mixing column 457 for forming the nitrogen-oxygen mixed fluid 384 output from the mixing column 457.

For the embodiment of FIG. 5, the nitrogen-oxygen mixed fluid 384 output from the mixing column 457 can be entirely liquid or be substantially entirely liquid (e.g. within 1 vol. % of being entirely liquid) The nitrogen-oxygen mixed fluid 384 can be fed from the mixing column 457 to the second reboiler-condenser 143. In the second reboiler-condenser 143, the nitrogen-oxygen mixed fluid 384 can be heated such that the liquid within this fluid is vaporized to form the mixed nitrogen and oxygen gas stream 186 that can be output from the second rebuilder-condenser 143.

The nitrogen-oxygen mixed fluid 384 fed to the second reboiler-condenser 143 can provide all of the condensation duty or refrigeration duty in the second reboiler-condenser 143 in some embodiments that utilize a mixing column 457 such as the embodiment shown in FIG. 5. This can be the case for all operating conditions or in at least some operating conditions of the plant 1. In such situations, there is no need for the second portion 134 of the HP oxygen-enriched stream 130 to be formed via splitting. Thus, the plant 1 can be operated so that this second portion 134 of the HP oxygen-enriched stream 130 is not formed and the entirety of the HP oxygen-enriched stream 130 is directed to the LP column 137.

In other situations or embodiments, a portion (but not 100%) of the duty of the second reboiler-condenser 143 may be provided by the nitrogen-oxygen mixed fluid 384 fed from the mixing column 457 to the second reboiler-condenser 143. In such a situation, formation of the second portion 134 of the HP oxygen-enriched stream 130 for feeding to the second reboiler-condenser 143 may be utilized to provide additional condensation duty or additional refrigeration duty for the second reboiler-condenser 143.

In the embodiment illustrated in FIG. 5, the formed mixed nitrogen and oxygen vapor can be output from the second reboiler-condenser 143 as a mixed nitrogen and oxygen gas stream 186. The mixed nitrogen and oxygen gas stream 186 can then be mixed with waste vapor takeoff 382 output from the mixing column 457 and the supplemental vapor waste stream 154 (if or when present) to form an oxygen and nitrogen mixed feed stream 158 for feeding to the subcooler 127 and then the first heat exchanger 105 (in series) so that this stream 158 can function as a cooling medium by absorbing heat from fluid passed through the subcooler 127 (e.g. absorbing heat from the second portion of the HP condensate flow 122 fed to the subcooler 127 to provide cooling) and the first heat exchanger 105 (e.g. absorbing heat from the one or more flow portions of the purified and pressurized gas stream 102). The mixed nitrogen and oxygen gas stream can be output from the first heat exchanger 105 as a mixed nitrogen and oxygen output stream 160, which can be conveyed for use elsewhere in the plant or facility connected to the plant (e.g. used for regeneration gas, etc.) or conveyed for emission out of the plant 1.

As mentioned previously, in a preferred operational situation for the embodiment of FIG. 5 (as well the exemplary embodiments of FIGS. 2, 3 and 4), the plant 1 can be operated to minimize the amount of fluid in the supplemental vapor waste stream 154 so that as much of the nitrogen-enriched vapor as feasible is output from the LP column 137 as the first nitrogen-enriched waste vapor stream 256. In some operational situations, there may be no flow of any supplemental vapor waste stream 154. In such situations, the first nitrogen-enriched waste vapor stream 256 can be considered the first and possibly only nitrogen-enriched waste vapor stream. In other situations, the supplemental vapor waste stream 154 can be minimized to keep this flow as low as possible to meet a certain set of desired operational design criteria.

Comparing the exemplary embodiments of FIGS. 4 and 5, it will be noted that the waste nitrogen output from the LP column 137 includes liquid. The quantity of liquid output from the mixing column 457 may therefore be greater than that of the embodiment of FIG. 4 in some comparable operational situations. Depending on the overall design objectives, the embodiment of FIG. 4 may be preferred over the embodiment of FIG. 5 or vice versa.

For all of the embodiments illustrated in FIGS. 1-5, the second reboiler-condenser 143 is a single reboiler-condenser unit or can be configured as a second reboiler-condenser 143 that has multiple (e.g. two or at least two) heat exchangers that operate in parallel with each heat exchanger condensing a fraction of the first argon-rich vapor stream 142 (e.g. the first argon-rich vapor stream 142 is split into multiple portions and each portion is sent to a respective one of the second reboiler-condenser heat exchanger units). This type of configuration for the second reboiler-condenser 143 can be particularly economically advantageous when both the nitrogen-oxygen mixed fluid stream (e.g. mixed nitrogen-oxygen fluid stream 184, 284, or 384) and second portion 134 of the HP oxygen-enriched stream 130 provide a fraction of the condensation duty or refrigeration duty in the second reboiler-condenser. For such embodiments utilizing parallel heat exchangers, each heat exchanger may receive both the nitrogen-oxygen mixed fluid stream (e.g. mixed nitrogen-oxygen fluid stream 184, 284, or 384) and second portion 134 of the HP oxygen-enriched stream or there may be first and second heat exchangers that operate in parallel where the first heat exchanger of the second reboiler-condenser 143 receives the nitrogen-oxygen mixed fluid stream (e.g. mixed nitrogen-oxygen fluid 184, 284, or 384) and the second heat exchanger of the second reboiler-condenser 143 receives the second portion 134 of the HP oxygen-enriched stream.

Modifications to the above discussed embodiments of FIGS. 1-5 can be made to form yet other embodiments. For instance, there are a number of vapor streams that may not considered products, e.g.: supplemental vapor waste stream 154, mixed nitrogen and oxygen gas stream 186, first LP oxygen-rich vapor stream 162, and waste vapor offtake flow 382. After these streams have been warmed to near ambient temperature, they can either be used for regeneration gas, or simply vented to atmosphere. The source pressures of these streams are generally different and the resultant mixing of the gases can represent an inefficiency due to loss of pressure in one of the streams. To minimize inefficiency, streams of similar pressure can be mixed with one another, or a large flow of a lower-pressure stream can be mixed with a small flow of a higher-pressure stream. In FIG. 1, the mixing of lower pressure mixed nitrogen and oxygen gas stream 186 with supplemental vapor waste stream 154 is shown. This is typically an acceptable approach since the flow of supplemental vapor waste stream 154 can be low, and the flow of mixed nitrogen and oxygen gas stream 186 may be high relative to the flow of the supplemental vapor waste stream 154.

However, if the flow of supplemental vapor waste stream 154 is high, it can be beneficial to instead mix supplemental vapor waste stream 154 with the first LP oxygen-rich vapor stream 162, and warm mixed nitrogen and oxygen gas stream 186 separately in subcooler 127 and first heat exchanger 105. In other embodiments, mixed nitrogen and oxygen gas stream 186 can be mixed with first LP oxygen-rich vapor stream 162 rather than mixing with supplemental vapor waste stream 154. It should be appreciated that there are many different combinations of the these streams that may be chosen for a particular embodiment in addition to what is illustrated and discussed herein, including warming all streams separately, or all stream as one to account for different design criteria or operational parameters.

As another example of modifications to the above discussed embodiments of FIGS. 1-5 that can be made to form yet other embodiments (which can include or not include the above noted mixing option that can be utilized in any of these embodiments), the use of the expander 115 for a second portion 112 of the pressurized second portion flow 112 after this flow has exited the first heat exchanger 105 may not be utilized for feeding the cooled turbo expander output stream 116 to the LP column 137. Instead, this cooled turbo expander output stream 116 can be fed to the HP column 107. Such a modification can increase argon recovery of the plant 1. However, such a change may also increase the power utilization of the process.

As yet another example of modifications to the above discussed embodiments of FIGS. 1-5 that can be made to form yet other embodiments (which can include or not include the above noted mixing option that can be utilized in any of these embodiments), the use of the expander 115 for a second portion 112 of the pressurized second portion flow 112 after this flow has exited the first heat exchanger 105 may not be utilized for feeding the cooled turbo expander output stream 116 to the LP column 137. Instead, some HP nitrogen-enriched vapor can be output from the HP column 107 to be passed through the first heat exchanger 105 for heating and subsequently output as another nitrogen-rich vapor product stream. For such embodiments, the HP nitrogen-enriched vapor can undergo an expansion via at least one expander to reduce its pressure and also undergo heating via at least one heat exchanger before this stream is passed through the first heat exchanger 105 and is output as an additional nitrogen vapor product stream. It is contemplated that utilization of this type of modification can provide recovery of argon and nitrogen similarly to other embodiments while also providing an additional nitrogen product stream that may be suitable for utilization downstream of the process.

As yet another example of modifications to the above discussed embodiments of FIGS. 1-5 that can be made to form yet other embodiments (which can include or not include the above noted mixing option that can be utilized in any of these embodiments and can also include or not include another above noted option concerning modification of the cooled turbo expander output stream 116 or use of an additional nitrogen-rich product stream), it may be desired to split the purified and pressurized gas stream 102 into more than two streams (e.g. split the steam into first, second, and third flow portions). For example, in some situations, the second portion of the second LP oxygen-rich liquid stream 166 that can be fed to the pump 169 via a pump feed conduit 168 can be of a sufficient fraction of the total oxygen in the gas feed 100 (e.g. air) that it may be desirable to split the purified and pressurized gas stream 102 so that a third portion of this stream was able to be passed through the first heat exchanger 105, optionally compressed, then passed through another heat exchanger for warming the second portion of the LP oxygen-rich liquid stream before or after it is passed through the pump 169. In such situations, this third portion of the purified and pressurized gas stream 102 may be cooled and condensed as a result of being passed through the heat exchanger for warming the second portion of the LP oxygen-rich liquid stream. This third portion of the purified and pressurized gas stream 102 that has been cooled and condensed can then be fed to the HP column 107 or the LP column 137 or may be split so that a portion of it is fed to the HP column 107 and a portion of it is fed to the LP column 137.

As yet another example of modifications to the above discussed embodiments of FIGS. 1-5 that can be made to form yet other embodiments (which can include or not include the above noted mixing option that can be utilized in any of these embodiments and can also include or not include another above noted option concerning modification of the cooled turbo expander output stream 116 or use of an additional nitrogen-rich product stream, and can include or not include the above noted use of a third portion of the purified and pressurized gas stream 102), the argon product can be output as a liquid instead of a gas in some embodiments. For instance, the phase separator for separation of the liquid from the vapor of the second reboiler-condenser output stream 144 of argon-rich fluid may not be used or needed. Instead, the vapor can be vented from the liquid and the liquid of the argon-rich fluid can be output as product. As another option, the second reboiler-condenser can be operated so that the output stream 144 of argon-rich fluid is entirely liquid. In such embodiments, a portion of the argon-rich liquid may be recycled back to the argon column as the liquid argon reflux stream 146 while the remaining portion is output as the argon product output stream 148.

Embodiments of the plant 1 can utilize a controller to monitor and control operations of the plant 1. For instance, embodiments of the plant 1 shown in FIGS. 1-5 as well as other embodiments explicitly discussed herein can include a controller such as the exemplary controller shown in FIG. 6. Temperature sensors, pressure sensors, flow sensors, and concentration sensors configured to detect a concentration of one or more compounds (e.g. O2, Ar, CO2, N2, CO, CH4, water, etc.) can be included for sensing and/or detecting flow rates, concentrations, temperatures or pressures of fluid flowing through different elements or units of the plant and/or conduits between those units. For example, there can be sensors positioned to detect (i) the air flow rate, pressure, temperature and feed concentrations for the air fed to the compression system 101, (ii) flow rate, pressure, temperature and/or feed concentrations of the air output from the compression system 101 for feeding to a heat exchanger (e.g. heat exchanger 105), (iii) flow rate, pressure, temperature and feed concentrations of the air output from a heat exchanger for feeding to another plant unit (e.g. multiple column unit including a high pressure column 107 and low pressure column 137), and/or (iv) the flow rate, pressure, temperature and constituent concentrations of the fluid output from a plant unit. There can also be other sensors positioned in the plant 1 to monitor and control the operations of these elements of the plant 1. A controller can be provided to receive data from these sensor and adjust operations of different elements based on the received sensor data. An example of such a controller can be seen in FIG. 6, and can include a processor connected to a non-transitory computer readable medium and at least one interface for communications with the sensors. The processor can run at least one automated control program stored in the computer readable medium (e.g. non-transitory memory, flash memory, etc.) that defines a method for controlling the operation of the plant and/or one or more elements of the plant.

It should be appreciated that embodiments of the controller can also be configured to utilize other sensor data to actuate different plant operations and use of different conduits for different flow paths of fluid to and from different elements. In some embodiments, the controller can be connected to a display, and at least one input device and/or input/output device to facilitate output of data to a user or operator and receipt of input from an operator. For instance, the controller can be connectable to an operator work station or a computer of an operator of the plant. The controller can also be connected to other plant control elements for incorporation into a larger automated process control system for the plant.

We have determined that embodiments of our plant 1, air separation process, and methods of making and using the same can be configured to provide an increase in argon recovery while also permitting plant operations to be performed at a lower operational cost by reducing the amount of power or energy needed for operations. For example, we determined that argon recovery can be sensitive to column pressure due to the low relative volatility of argon, which can make separation of argon difficult, as well as the sensitivity of the relative volatility of argon with pressure (e.g. relative volatile of argon decreases with increasing pressure). We determined that such issues could be addressed by mixing waste nitrogen with oxygen to lower the boiling point of the fluid used as a cooling medium for cooling the argon output from the argon column 139 via the second reboiler-condenser 143. This change in boiling point provided by this mixing of nitrogen with oxygen can permit the operational pressure of the argon column 139 to be lower. This can help provide improved recovery of argon in addition to reduced operational costs.

For example, we performed fundamental simulations to evaluate argon recovery and power consumption for the embodiments shown in FIGS. 1-5 that utilized the argon column 139 operating at a top pressure of 1.3 atmospheres (atm.), the LP column 137 operating at a top pressure of 1.5 atm and the plant 1 was operated such that the second portion 134 of the HP oxygen-enriched stream 130 was not formed and the entirety of the HP oxygen-enriched stream 130 was directed to the LP column 137. These simulations established the embodiments of FIGS. 1-5 can provide similar-to-higher argon recovery while also permitting power consumption to be reduced, which can reduce the operational costs for operation of the plant and also reduce emissions associated with operation of the plant 1 to provide a more environmentally friendly plant operation. For example, in these conducted simulations, argon recovery was found to be increasable over conventional processing by up to 31.6% at neutral power. Compared to a conventional process using a process disclosed in U.S. Pat. No. 4,822,395, our simulation results showed that argon recovery in embodiments of our process can be increased by 19% while also providing a 2% power reduction.

Different operational situations for the embodiment of FIG. 4 were also simulated. These operational simulations included five different operational cases in which the argon column 139 operated at a top pressure of 1.3 atm., the LP column 137 operated at a top pressure of 1.5 atm and the plant 1 operated such that the second portion 134 of the HP oxygen-enriched stream 130 was formed and utilized at different flow rates. The conducted simulations also included a sixth operational situation in which the argon column 139 operated at a top pressure of 1.1 atm., the LP column 137 operated at a top pressure of 1.3 atm and the plant 1 operated such that the second portion 134 of the HP oxygen-enriched stream 130 was formed and utilized at a particular flow rate. In all the conducted simulations, the plant 1 operated such that improved argon recovery and/or a reduction in power consumption as compared to conventional designs were obtainable. For example, argon recovery in the conducted cases was found to be adjustable from 67.5% to 95.1%. This type of increase in argon recovery could be provided with a relatively modest 1.1% power increase. These simulation results demonstrate that embodiments of the plant 1 could be designed and operated to meet a particular design objective to provide improved argon recovery and/or reduced operational power requirements.

It should be appreciated that modifications to the embodiments explicitly shown and discussed herein can be made to meet a particular set of design objectives or a particular set of design criteria. For instance, the arrangement of valves, piping, and other conduit elements (e.g. conduit connection mechanisms, tubing, seals, etc.) for interconnecting different units of the plant for fluid communication of the flows of fluid between different units can be arranged to meet a particular plant layout design that accounts for available area of the plant, sized equipment of the plant, and other design considerations. For instance, the size of each column, number of stages each column has, the size and arrangement of each reboiler-condenser, and the size and configuration of any heat exchanger, conduits, expanders, pumps, or compressors can be modified to meet a particular set of design criteria. As another example, the flow rate, pressure, and temperature of the fluid passed through one or more heat exchangers as well as passed through other plant elements can vary to account for different plant design configurations and other design criteria. As yet another example, the number of plant units and how they are arranged can be adjusted to meet a particular set of design criteria. As yet another example, the material composition for the different structural components of the units of the plant and the plant can be any type of suitable materials as may be needed to meet a particular set of design criteria.

It should be appreciated that embodiments of the plant can be configured as an air separation plant or other type of plant in which it is desired to recover nitrogen and/or argon from a feed gas (e.g. air, waste emissions from a plant, etc.). The plant can be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the processes utilized to recover fluids (e.g. oxygen, argon and nitrogen) from air, gas separation plants configured to recover nitrogen, argon and/or oxygen from at least one feed gas, air separation plants, air separation systems, systems utilizing at least three columns to recover nitrogen, argon, and oxygen fluids, plants utilizing such systems or processes, and methods of making and using the same have been shown and described above, it is to be distinctly understood that the invention is not limited thereto but may be otherwise variously embodied and practiced within the scope of the following claims.

What is claimed is:

1. A process for separation of a feed gas comprising oxygen, nitrogen, and argon, the process comprising:
   compressing a feed gas via a compression system of a separation system having a first column and a second column, the first column being a high pressure (HP) column operating at a pressure that is higher than the second column, the second column being a low pressure (LP) column operating at a pressure that is lower than the first column;
   feeding the compressed feed gas to a first heat exchanger to cool the compressed feed gas;
   feeding at least a first portion of the compressed and cooled feed gas to the HP column to produce a first HP nitrogen-enriched vapor and a first HP oxygen-enriched stream;
   condensing at least a portion of the first HP nitrogen-enriched vapor via a first reboiler-condenser to form an HP condensate so that a first portion of the HP condensate is recyclable to the HP column;

outputting a first nitrogen-enriched stream, a first LP oxygen-rich liquid steam, and a first argon-enriched vapor stream from the LP column, the first LP oxygen-rich liquid having an oxygen content of at least 98 mol % oxygen;

feeding the first argon-enriched vapor stream to an argon column to form a first argon-rich vapor stream that is feedable to a second reboiler-condenser and an argon-depleted liquid stream that is feedable to the LP column;

at least partially condensing the first argon-rich vapor stream output from the argon column via the second reboilier-condenser;

mixing the first nitrogen-enriched stream output from the LP column with the first LP oxygen-rich liquid stream output from the LP column for forming a mixed nitrogen-oxygen fluid stream to feed to the second reboiler-condenser to provide at least a portion of a refrigeration duty of the second reboiler-condenser for the at least partially condensing of the first argon-rich vapor stream.

2. The process of claim 1, the process also comprising: splitting the compressed feed gas into the first portion and a second portion; and feeding the second portion of the compressed feed gas to an expander for reducing its pressure for feeding it to the LP column after the second portion of the compressed feed gas is passed through the first heat exchanger.

3. The process of claim 1, wherein the feed gas is air and the compression system includes a purification unit that removes at least one of carbon dioxide and water from the feed gas after the feed gas is compressed, and wherein the process also comprises:

passing a first nitrogen-rich vapor stream output from the LP column and a second portion of the HP condensate output from the first reboiler-condenser through a subcooler so that the second portion of the HP condensate is cooled via the subcooler before the second portion of the HP condensate is fed to the LP column.

4. The process of claim 1, wherein the first nitrogen-enriched stream is a first nitrogen-enriched liquid waste stream and wherein the mixed nitrogen-oxygen fluid stream is a mixture of the first nitrogen-enriched liquid waste stream and the first LP oxygen-rich liquid stream.

5. The process of claim 1, wherein the first nitrogen-enriched stream is a first nitrogen-enriched vapor waste stream and wherein the mixed nitrogen-oxygen fluid stream is a mixture of the first nitrogen-enriched vapor waste stream and the first LP oxygen-rich liquid stream.

6. The process of claim 1, wherein the first nitrogen-enriched stream is a first nitrogen-enriched vapor waste stream and wherein the mixing includes:

mixing the first nitrogen-enriched vapor waste stream with the first LP oxygen-rich liquid stream to form a mixture and subsequently feeding the mixture to a phase separator to form the mixed nitrogen-oxygen fluid stream.

7. The process of claim 6, wherein the mixed nitrogen-oxygen fluid stream is a liquid.

8. The process of claim 1, wherein the first nitrogen-enriched waste stream is a first nitrogen-enriched vapor waste stream and wherein the mixing is performed via a mixing column, the first nitrogen-enriched vapor waste stream and the first LP oxygen-rich liquid stream being fed to the mixing column to perform the mixing to form the mixed nitrogen-oxygen fluid stream.

9. The process of claim 8, wherein the mixed nitrogen-oxygen fluid stream is a liquid.

10. The process of claim 1, wherein a second nitrogen-enriched stream is output from the LP column, the first nitrogen-enriched stream being a first nitrogen-enriched vapor waste stream and the second nitrogen-enriched stream being a first nitrogen-enriched liquid waste stream, and wherein the mixing is performed via a mixing column, the first nitrogen-enriched liquid waste stream, the first nitrogen-enriched vapor waste stream and the first LP oxygen-rich liquid stream being fed to the mixing column to perform the mixing to form the mixed nitrogen-oxygen fluid stream.

11. The process of claim 10, wherein the first nitrogen-enriched liquid waste stream is fed adjacent to or at a bottom of the mixing column and the first LP oxygen-rich liquid is fed adjacent a top of the mixing column.

12. The process of claim 1, wherein the at least the portion of the refrigeration duty of the second reboiler-condenser for the at least partially condensing of the first argon-rich vapor stream is an entirety of the refrigeration duty for the at least partially condensing of the first argon-rich vapor stream.

13. The process of claim 1, wherein the at least partially condensing of the first argon-rich vapor stream is a complete condensing of the first argon-rich vapor so that a second reboiler-condenser output stream of the second reboiler-condenser is an argon-rich liquid.

14. A separation system comprising:
a compression system;
a first heat exchanger;
a first column and a second column, the first column being a high pressure (HP) column operating at a pressure that is higher than the second column, the second column being a low pressure (LP) column operating at a pressure that is lower than the first column;
a first reboiler-condenser; and
a second reboiler-condenser;
the compression system, the first heat exchanger, and the HP column positioned and arranged so that a feed gas is compressible via the compression system before the compressed feed gas is fed to the first heat exchanger and at least a first portion of the compressed feed gas is feedable to the HP column after passing through the first heat exchanger;
the HP column positioned and configured to produce a first HP nitrogen-enriched vapor stream and a first HP oxygen-enriched stream;
the first reboiler-condenser positioned to receive at least a portion of the first HP nitrogen-enriched vapor to form an HP condensate so that a first portion of the HP condensate is recyclable to the HP column;
the LP column positioned and configured to output a first nitrogen-enriched stream, a first LP oxygen-rich liquid steam, and a first argon-enriched vapor stream, the first LP oxygen-rich liquid stream having an oxygen content of at least 98 mol % oxygen;
an argon column positioned and configured to receive the first argon-enriched vapor stream output from the LP column to form a first argon-rich vapor stream that is feedable to the second reboiler-condenser and an argon-depleted liquid stream that is feedable to the LP column;
the second reboiler-condenser positioned and configured to at least partially condense the first argon-rich vapor stream; and
separation the system configured such that the first nitrogen-enriched waste stream output from the LP column is mixable with the first LP oxygen-rich stream output from the LP column for forming a mixed nitrogen-oxygen fluid stream to feed to the second reboiler-condenser to provide at least a portion of a refrigeration duty of the second reboiler-condenser for the at least partially condensing of the first argon-rich vapor stream.

15. The separation system of claim 14, wherein the separation system includes a mixing column, the mixing column being positioned and configured to receive the first LP oxygen-rich liquid stream output from the LP column and the first nitrogen-enriched stream output from the LP column to form the mixed nitrogen-oxygen fluid stream.

16. The separation system of claim 14, wherein the separation system includes a mixing column, the mixing column being positioned and configured to receive the first LP oxygen-rich stream output from the LP column, the first nitrogen-enriched stream output from the LP column, and a second nitrogen-enriched stream output from the LP column to form the mixed nitrogen-oxygen fluid stream, wherein the first nitrogen-enriched stream is a first nitrogen-enriched liquid waste stream and the second nitrogen-enriched stream is a first nitrogen-enriched vapor waste stream.

17. The separation system of claim 14, wherein the separation system includes a phase separator positioned and configured to receive the mixed nitrogen-oxygen fluid stream so that a liquid portion of the mixed nitrogen-oxygen fluid stream is fed to the second reboiler-condenser.

18. The separation system of claim 14, wherein the first nitrogen-enriched stream output from the LP column is a first nitrogen-enriched vapor waste stream or a first nitrogen-enriched liquid waste stream.

19. The separation system of claim 14, comprising:
a subcooler positioned and configured so that a second portion of the HP condensate outputtable from the first reboiler-condenser is passable through the subcooler before the second portion of the HP condensate is fed to the LP column and a first nitrogen-rich vapor stream outputtable from the LP column is passable through the subcooler, the second portion of the HP condensate being cooled via the subcooler and the first nitrogen-rich vapor stream being heated via the subcooler.

20. The separation system of claim 14, comprising an expander; and
wherein the separation system is configured such that the compressed feed gas is split into multiple flow portions that include the first portion of the compressed feed gas that is feedable to the HP column and a second portion of the compressed feed gas, the expander positioned and configured to receive the second portion of the compressed feed gas to reduce the pressure of the second flow portion of the compressed feed gas for feeding it to the LP column.

* * * * *